April 29, 1952 H. A. SKOG 2,594,362
FRUIT PITTING AND PEELING APPARATUS
Filed Feb. 9, 1950 20 Sheets-Sheet 1

INVENTOR.
Henry A. Skog
BY Cox Moore & Olson attys

INVENTOR.
Henry A. Skog

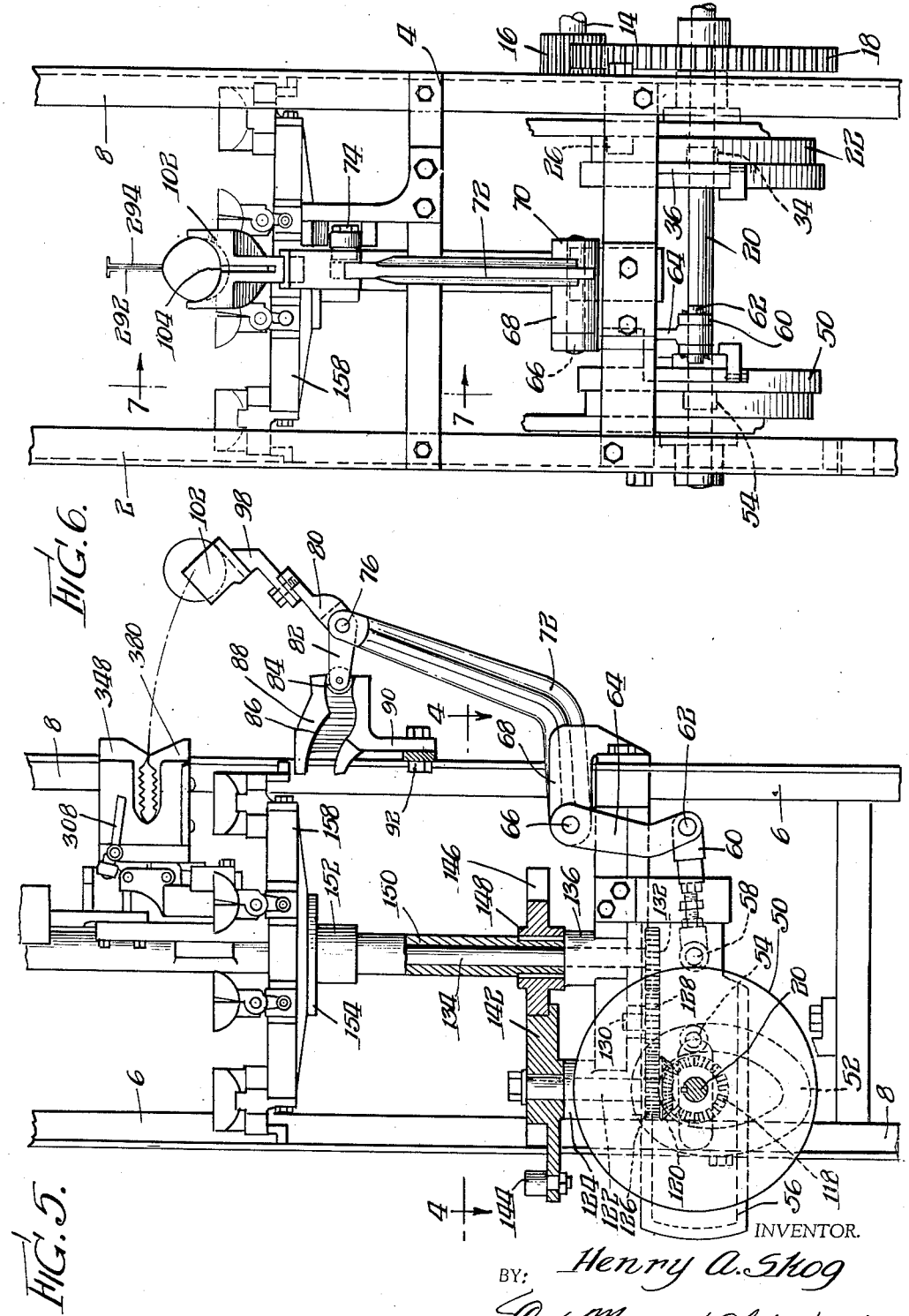

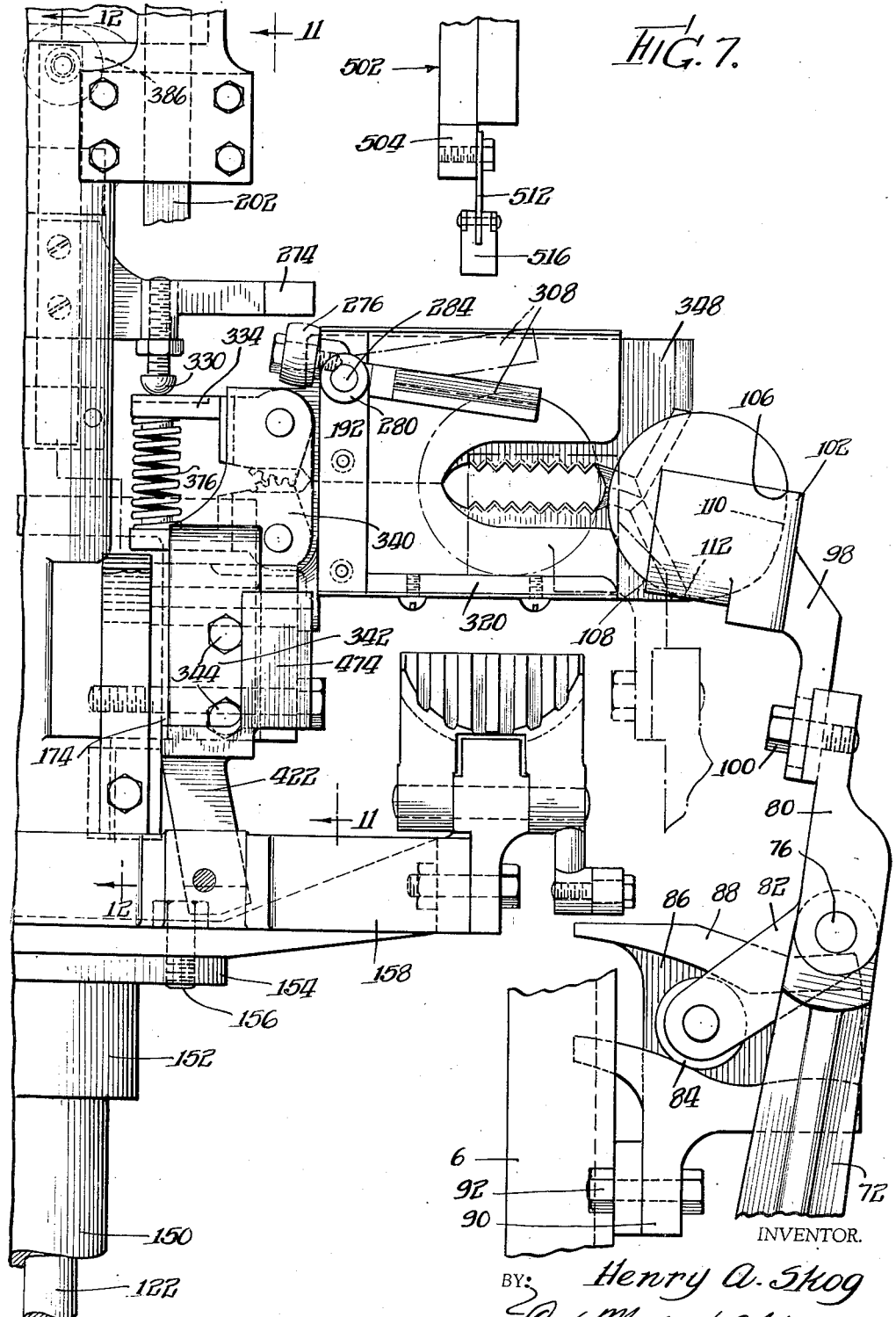

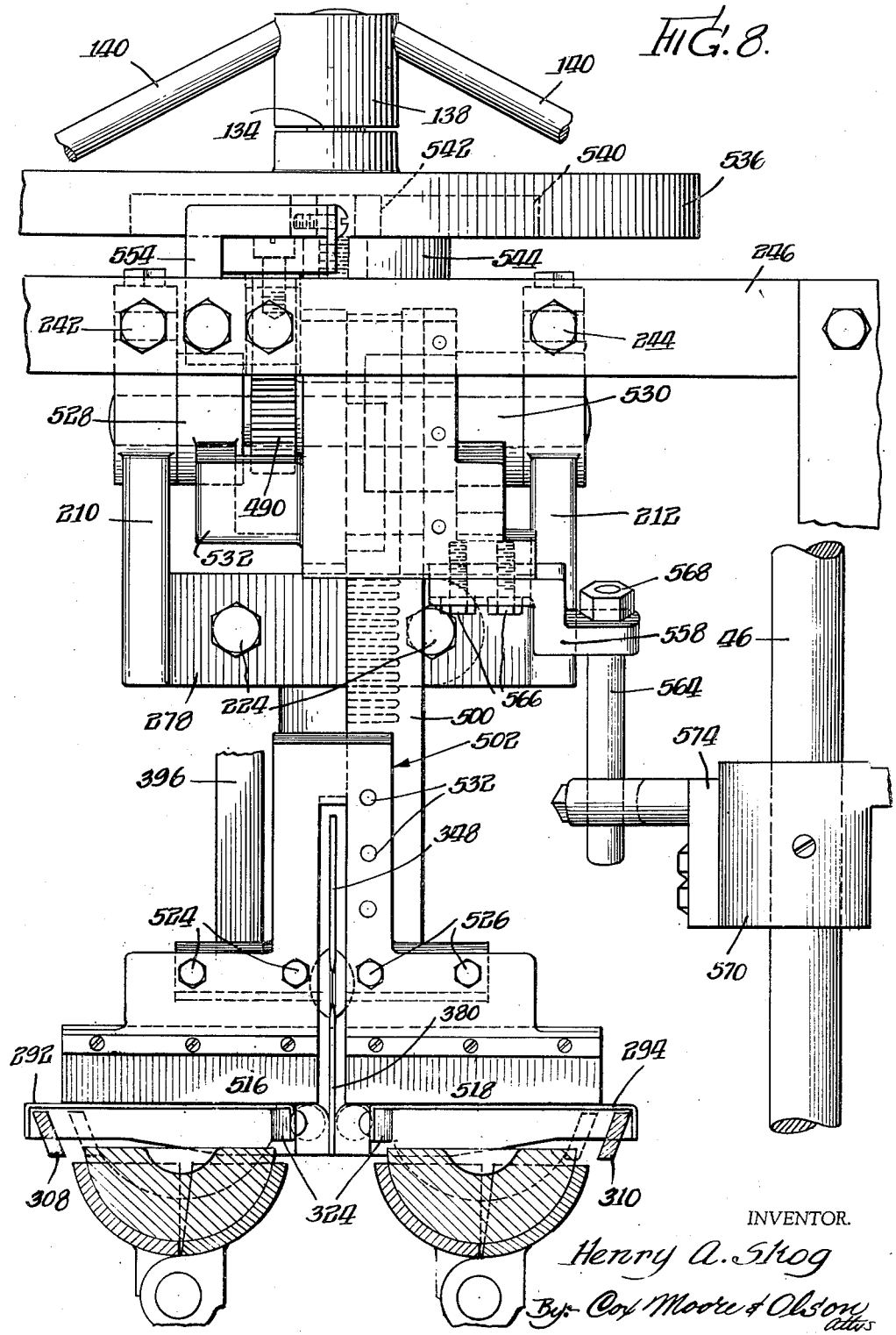

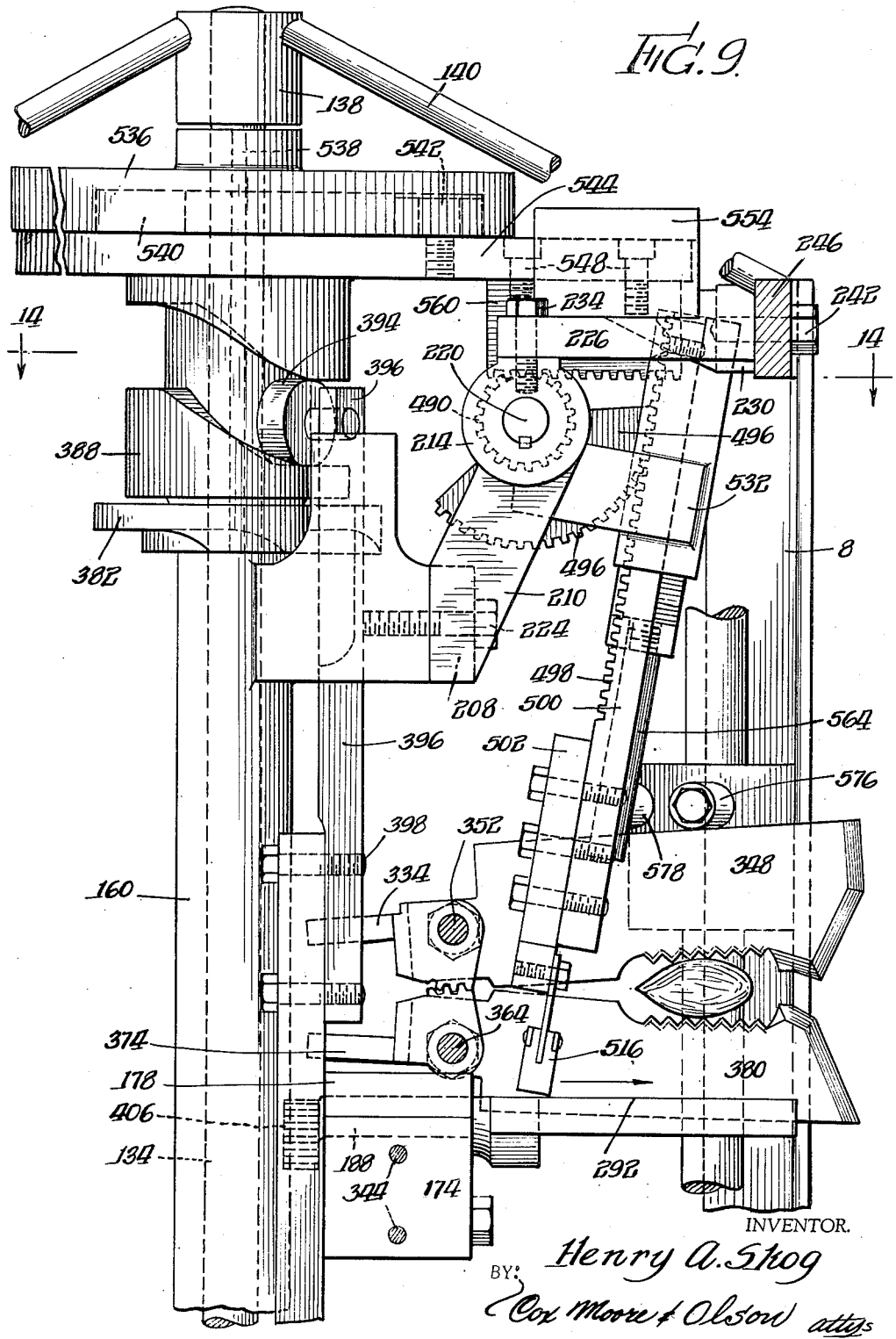

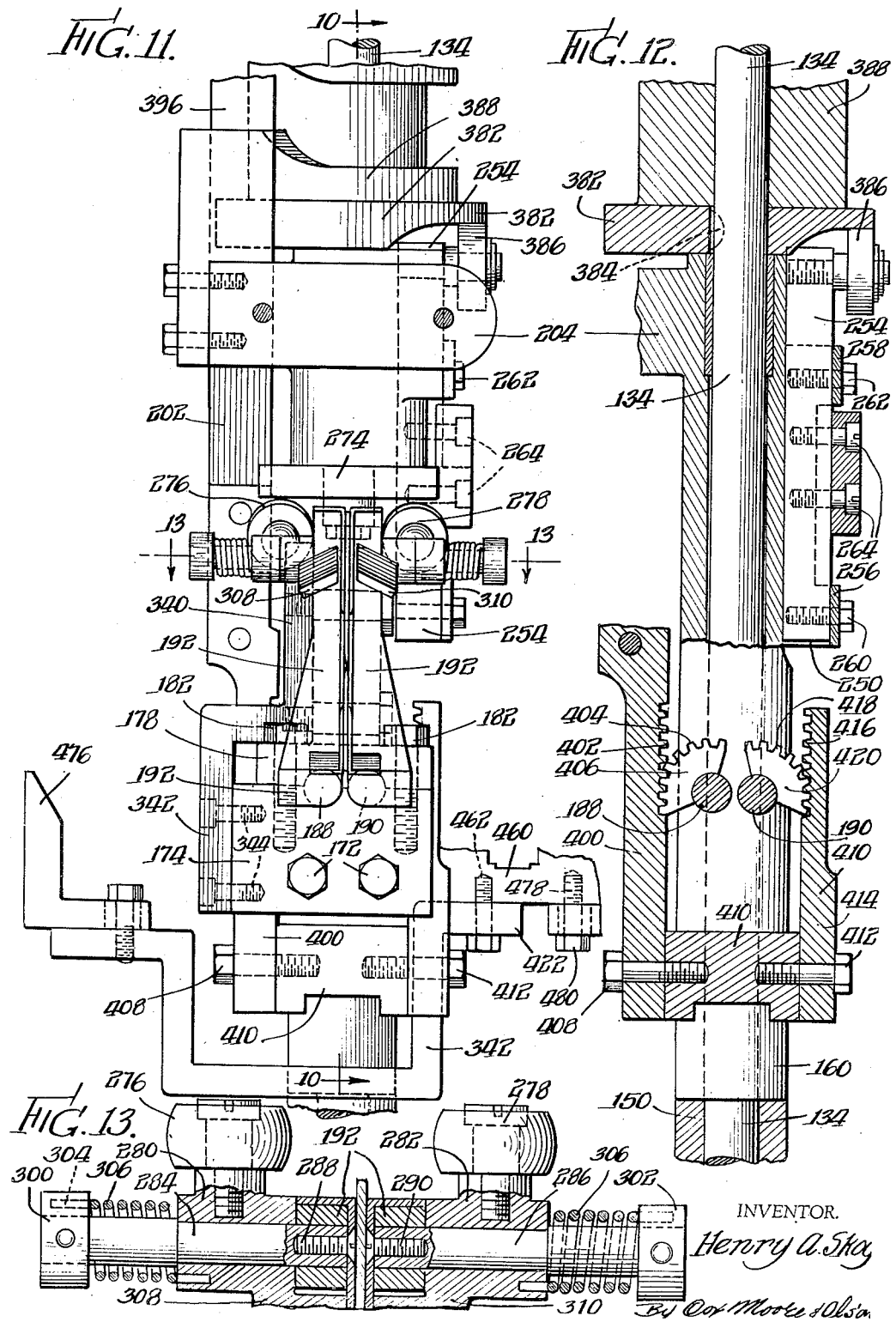

April 29, 1952  H. A. SKOG  2,594,362
FRUIT PITTING AND PEELING APPARATUS
Filed Feb. 9, 1950  20 Sheets-Sheet 9

INVENTOR.
Henry A. Skog
BY: Cox Moore & Olson attys

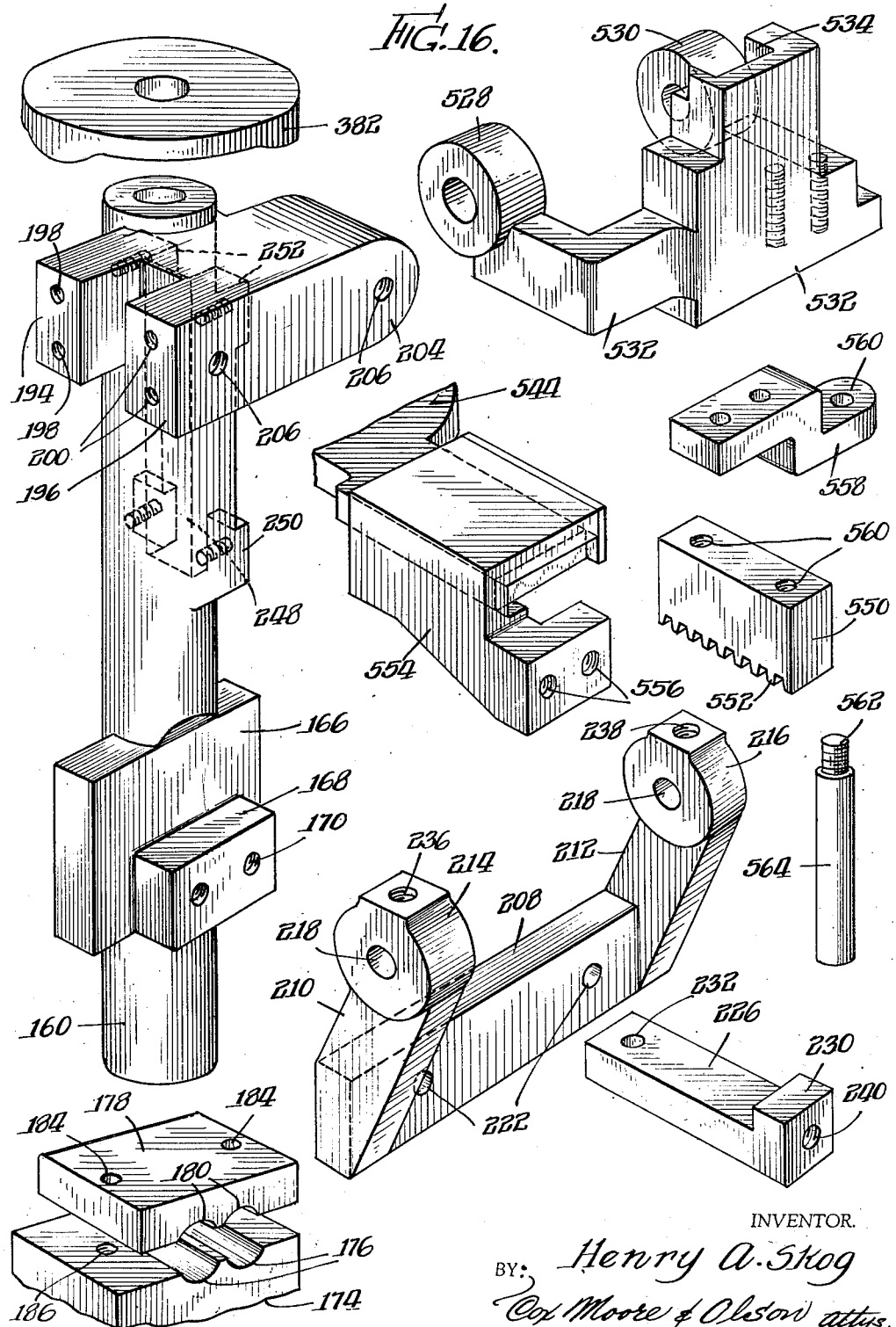

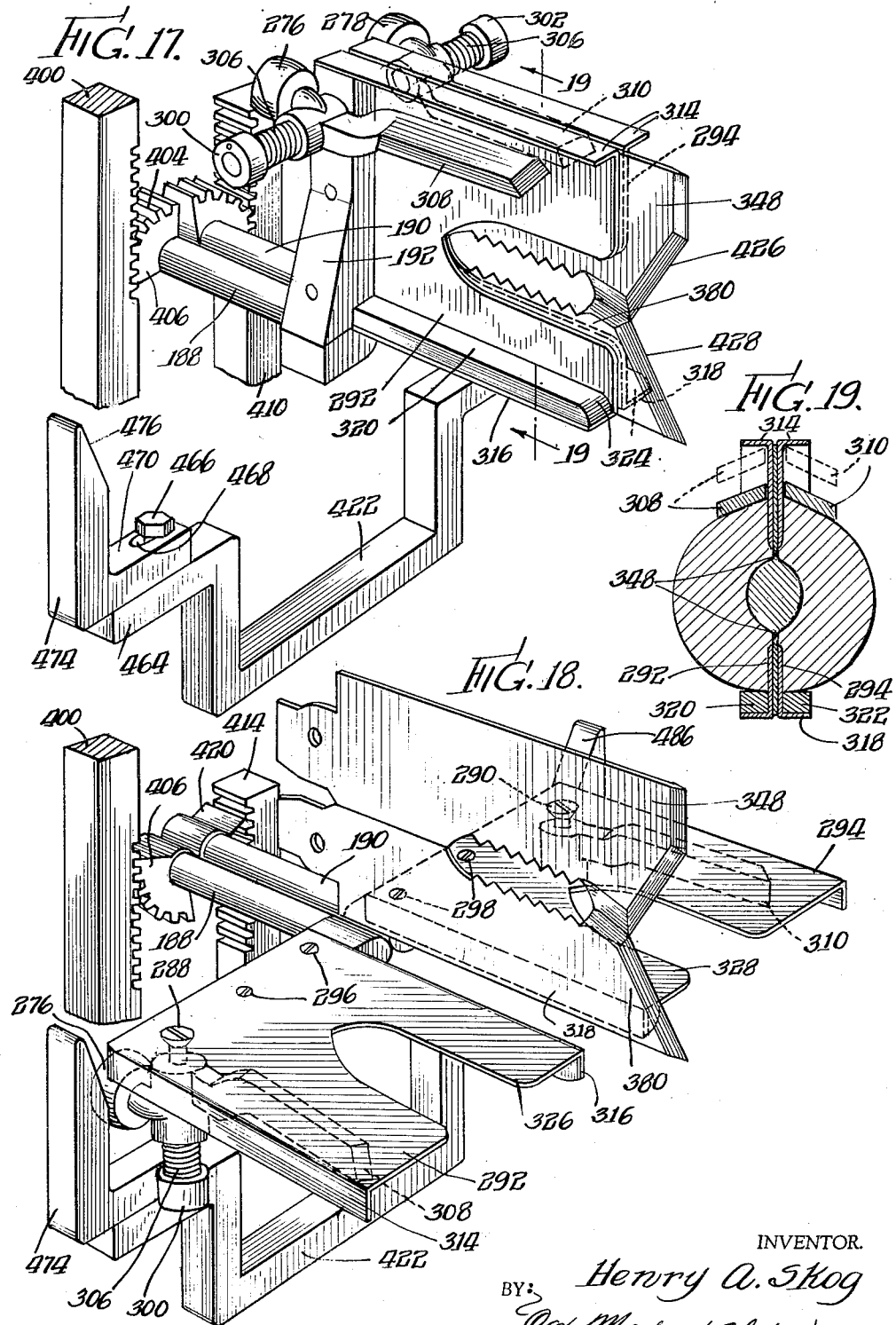

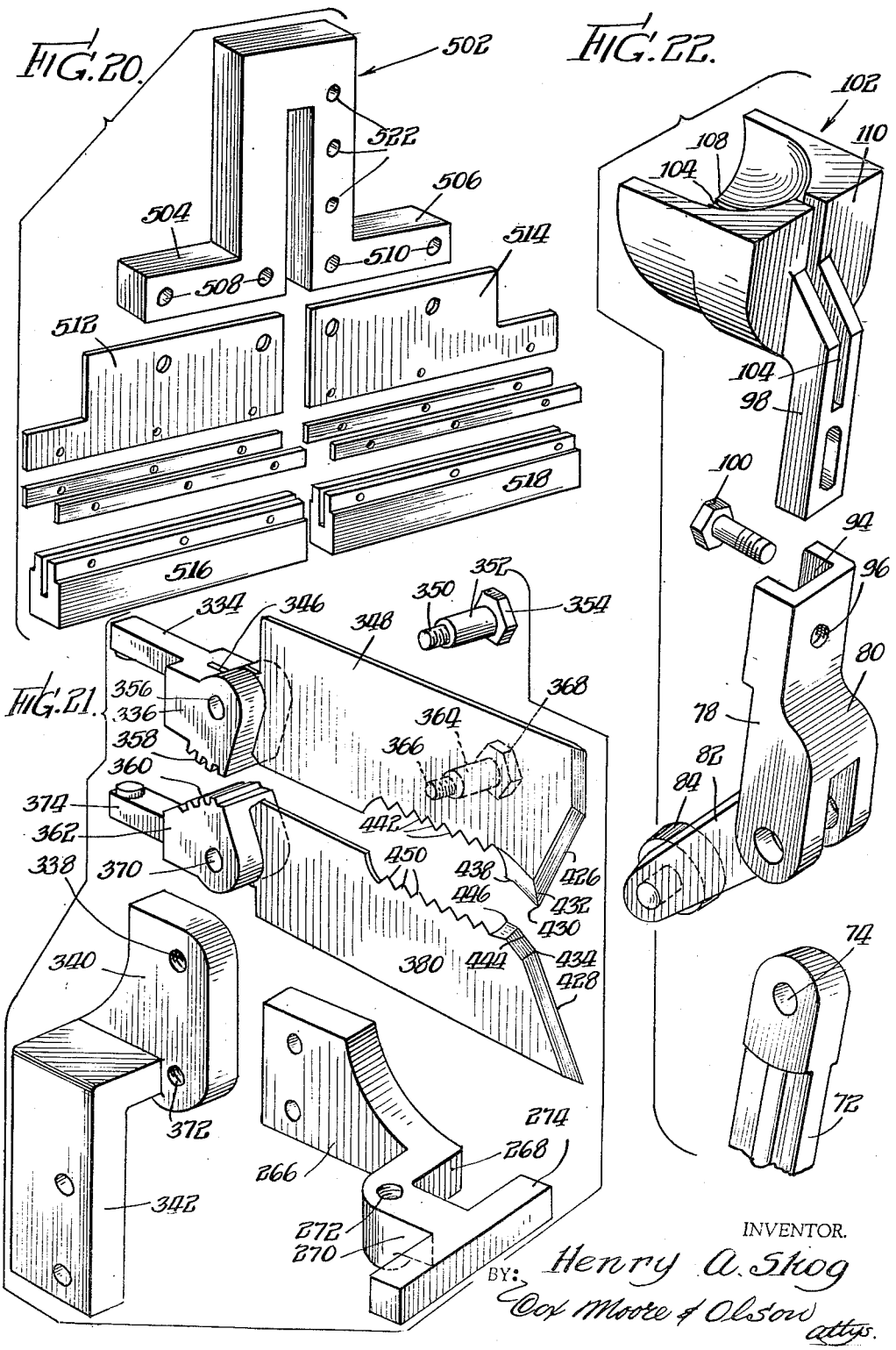

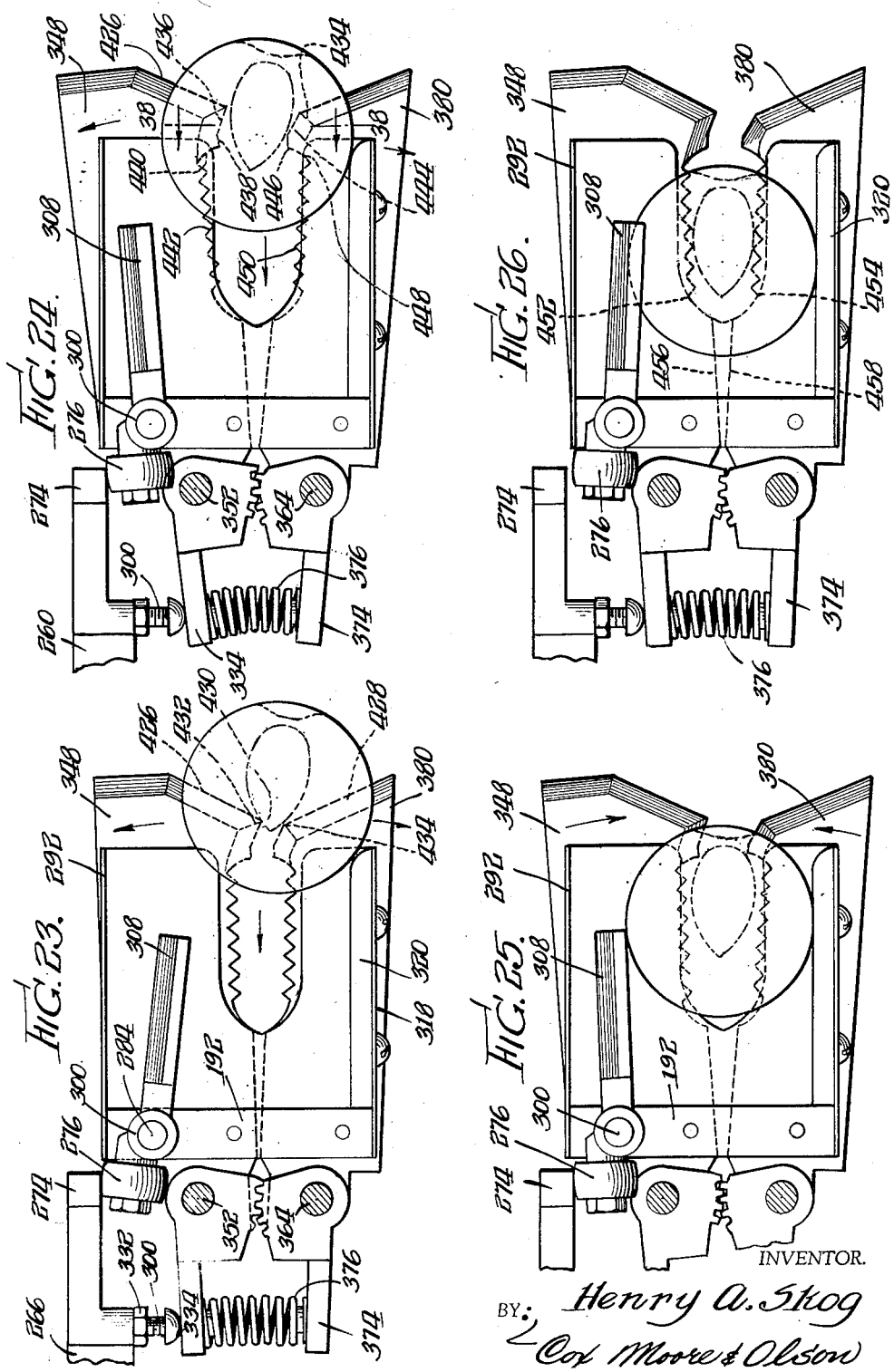

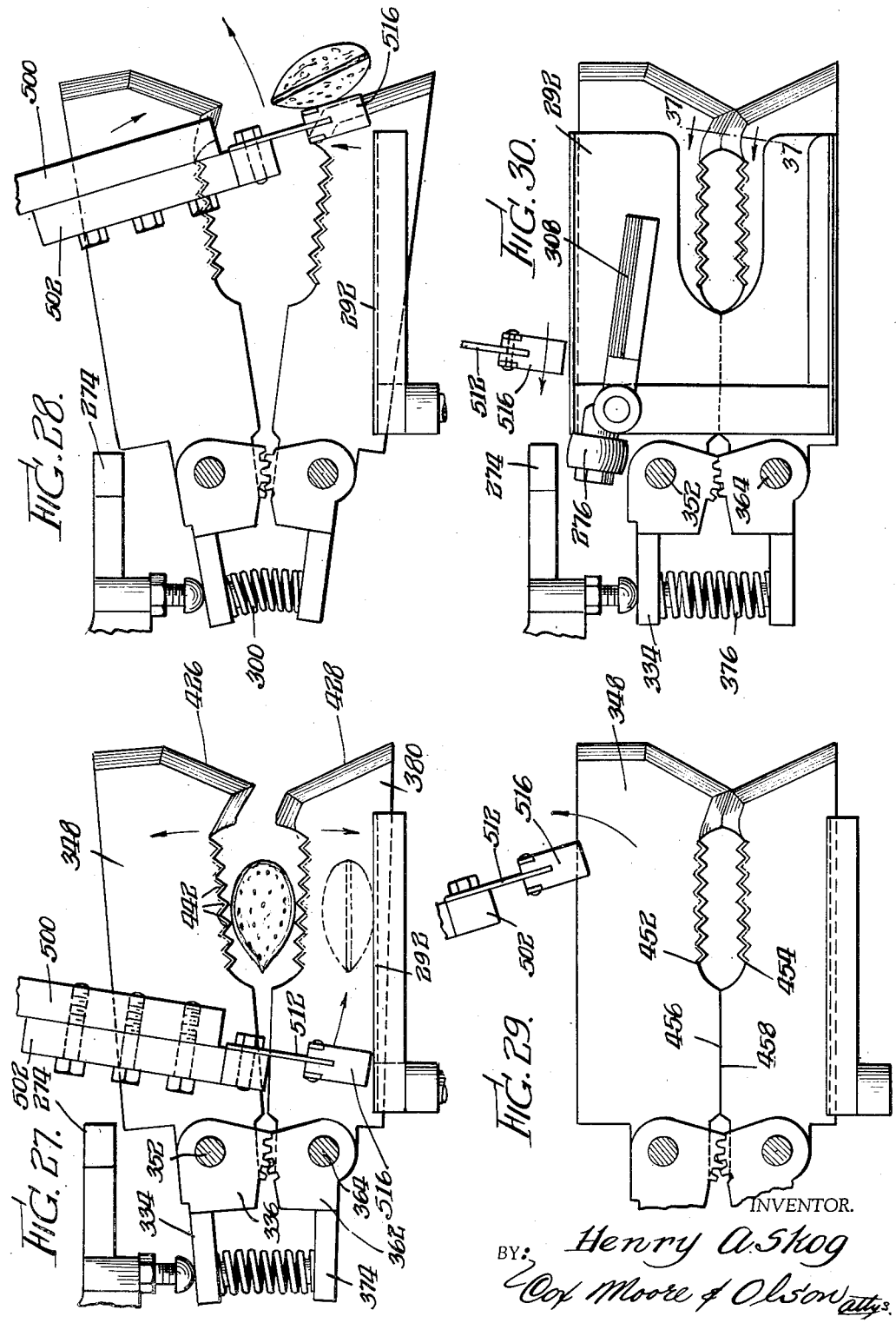

April 29, 1952
H. A. SKOG
2,594,362
FRUIT PITTING AND PEELING APPARATUS
Filed Feb. 9, 1950
20 Sheets-Sheet 15
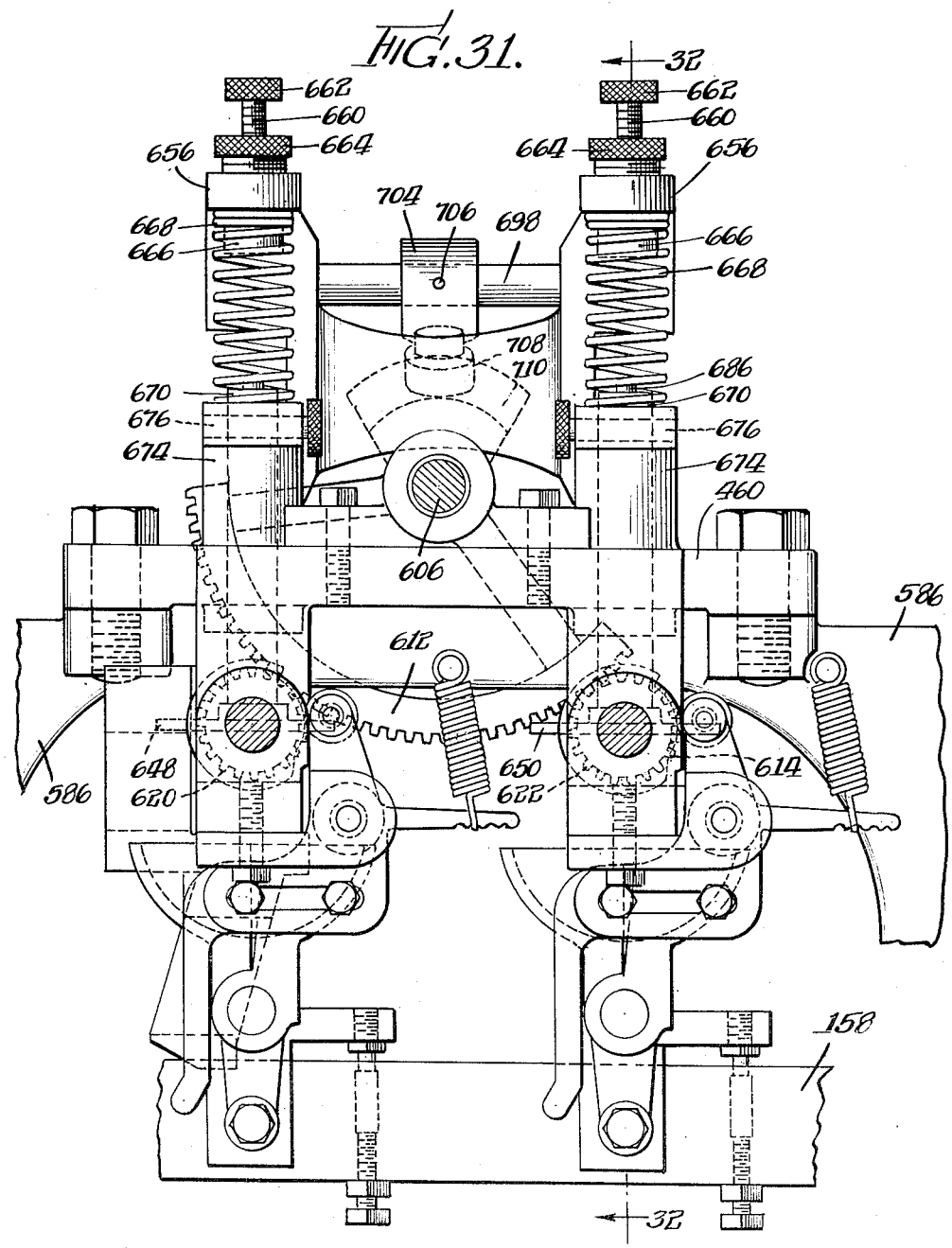
INVENTOR.
Henry A. Skog
BY Cox Moore & Olson attys.

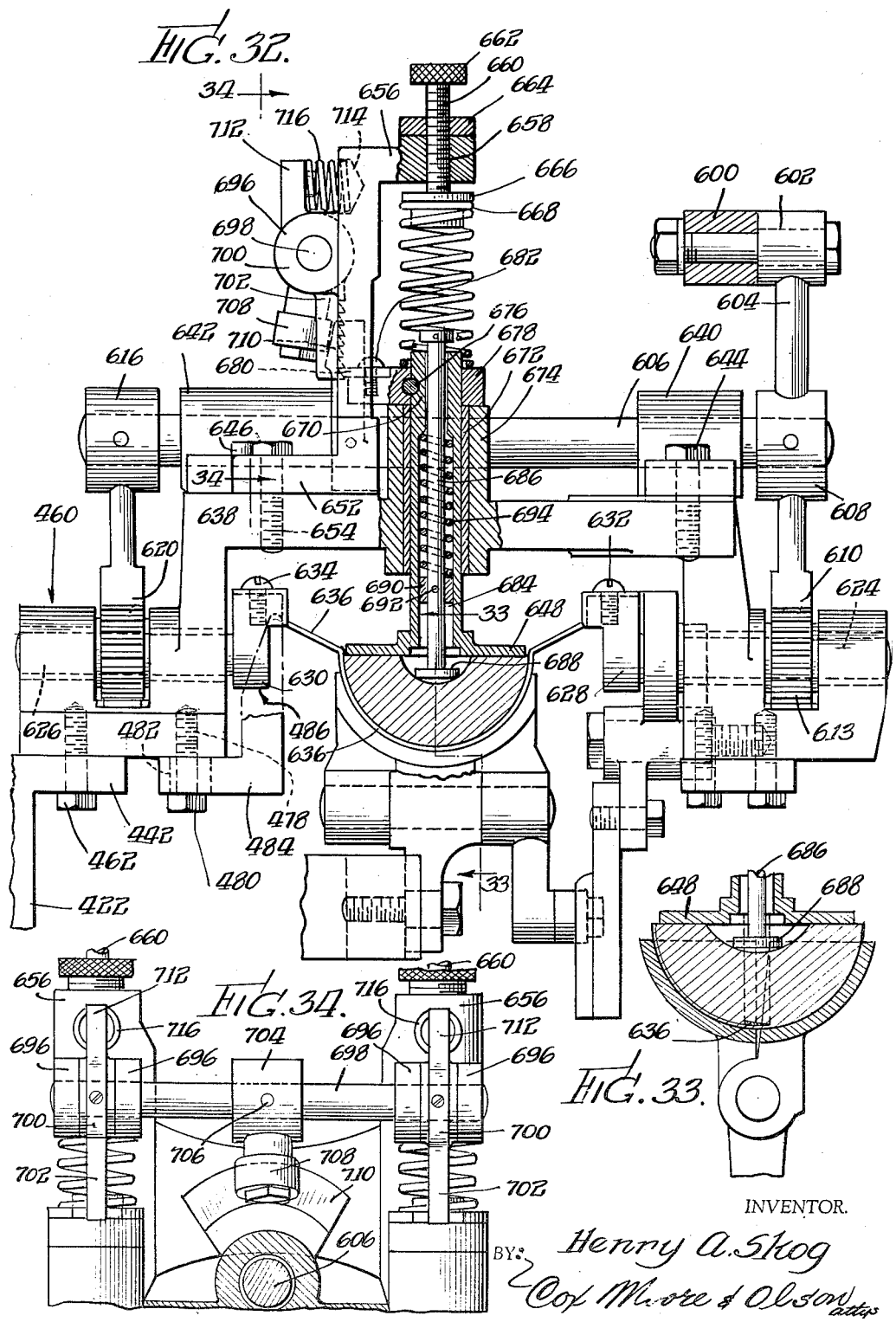

April 29, 1952     H. A. SKOG     2,594,362
FRUIT PITTING AND PEELING APPARATUS
Filed Feb. 9, 1950     20 Sheets-Sheet 17
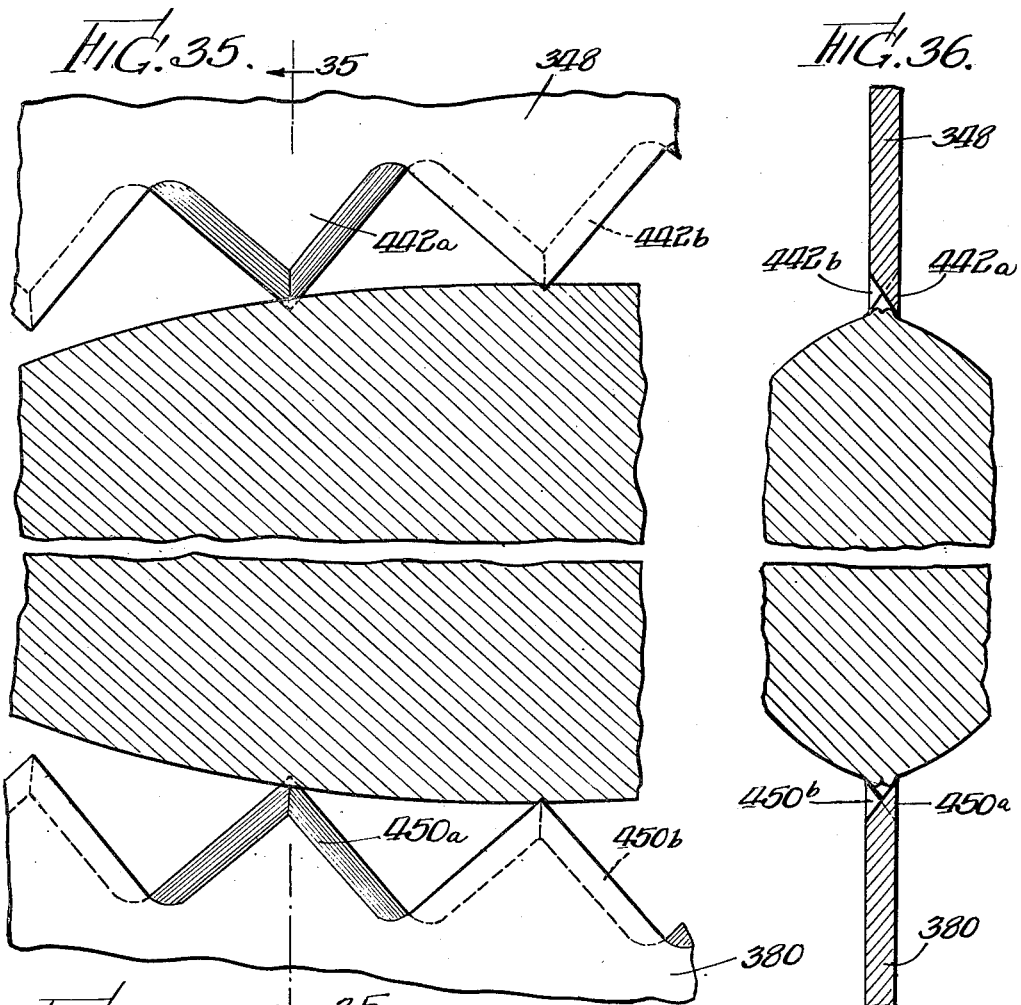
INVENTOR.
Henry A. Skog
By:- Coy Moore & Olson
attys.

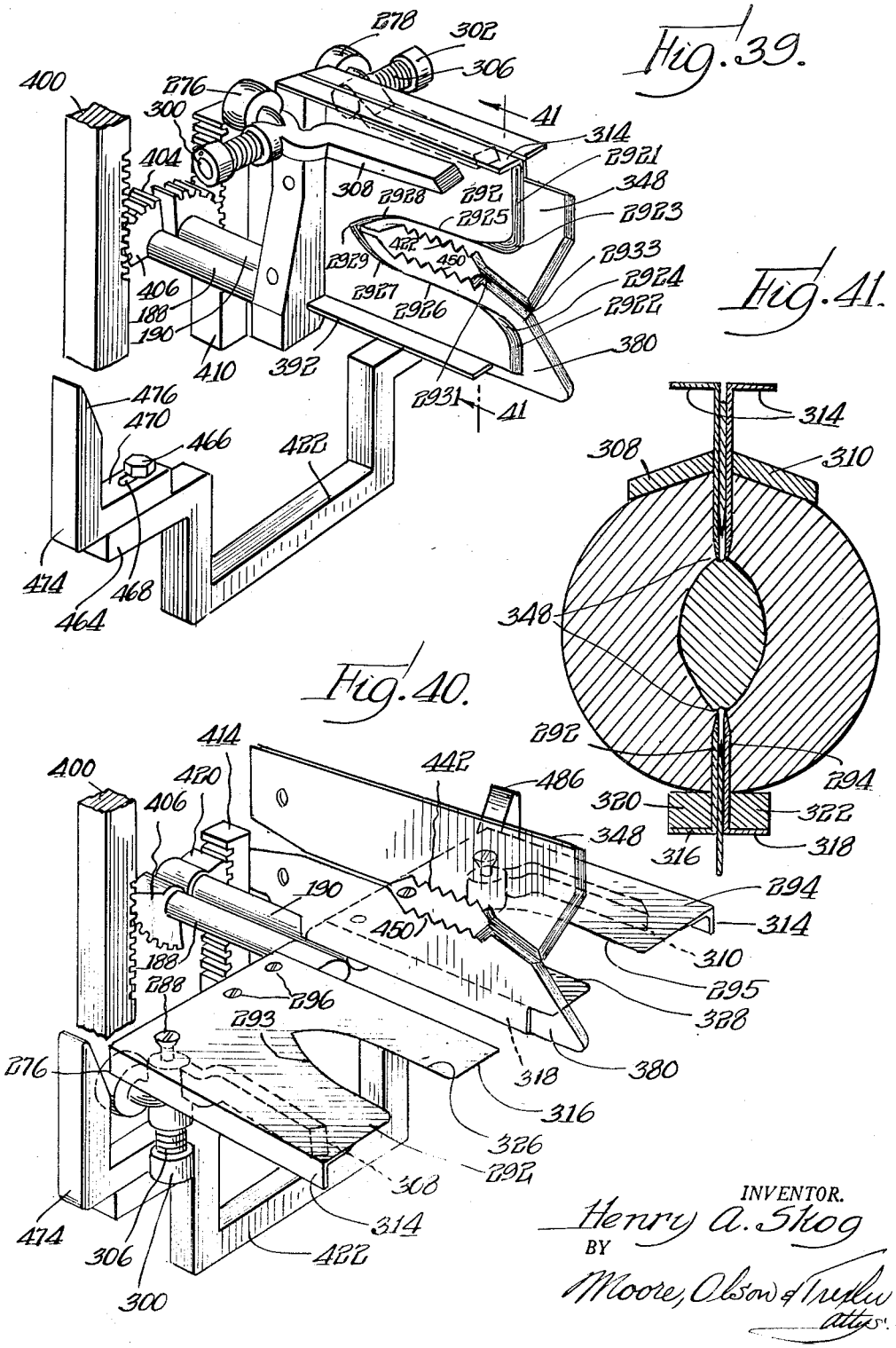

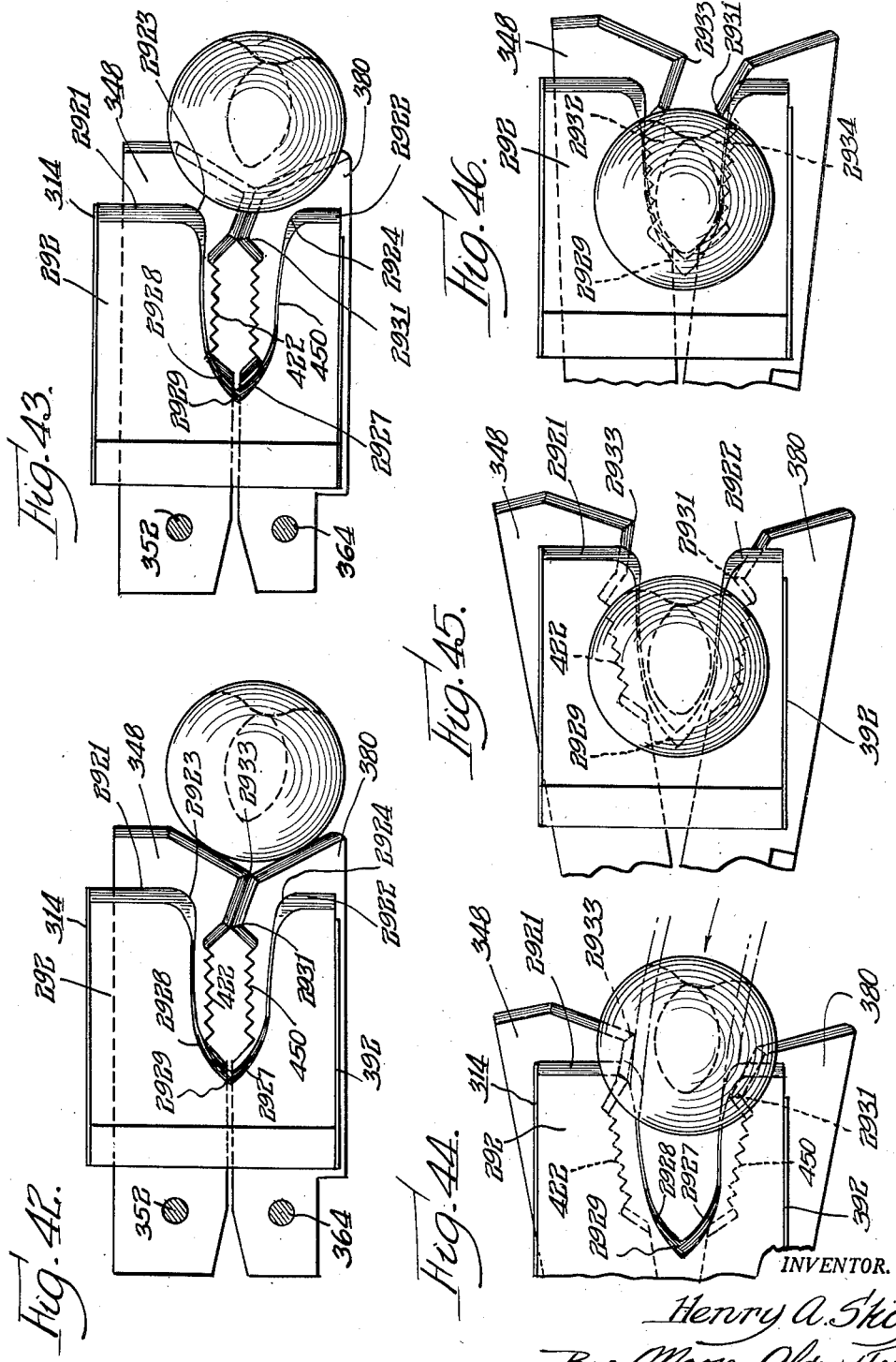

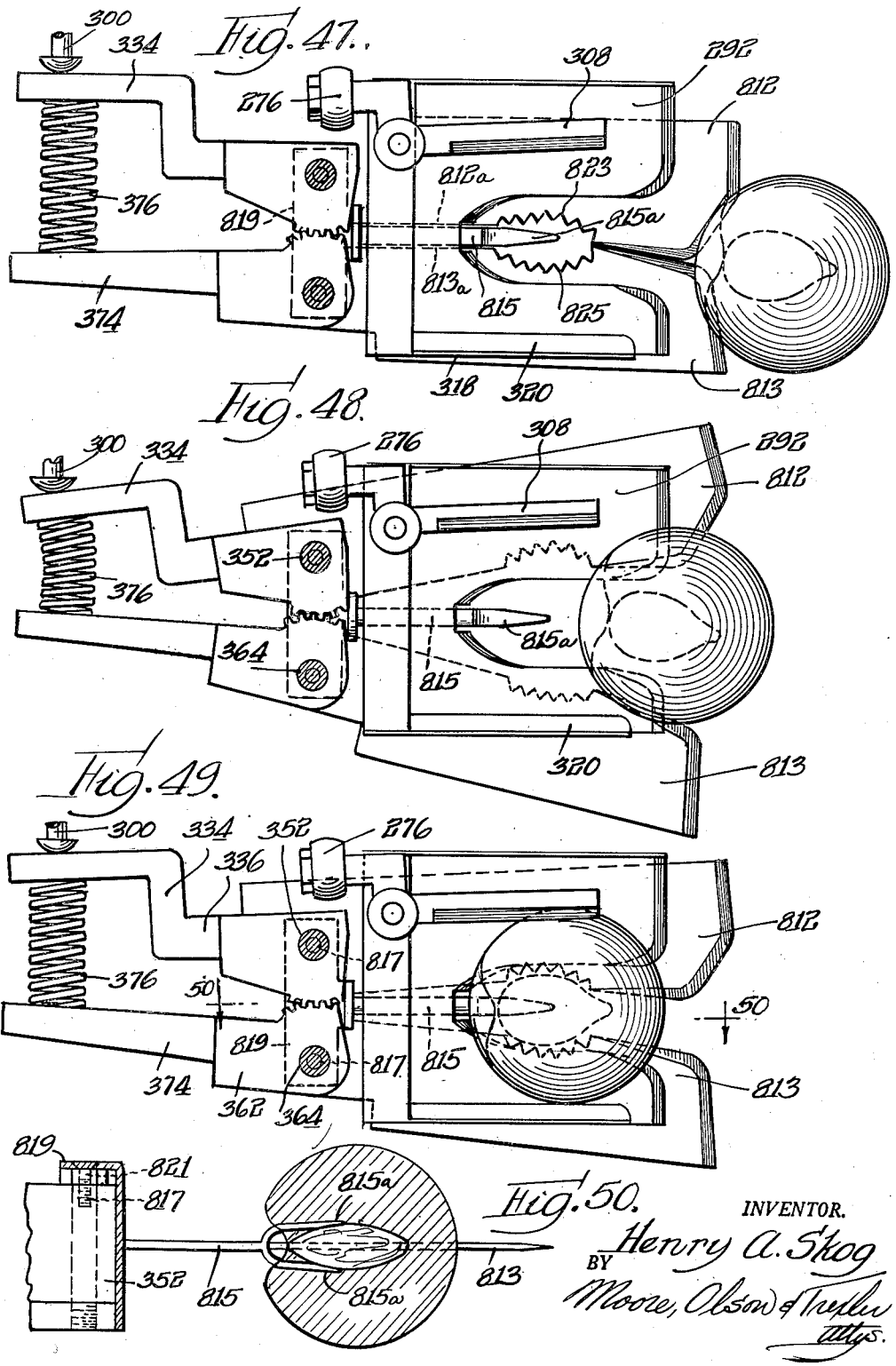

Patented Apr. 29, 1952

2,594,362

UNITED STATES PATENT OFFICE 2,594,362

FRUIT PITTING AND PEELING APPARATUS

Henry A. Skog, Olympia, Wash., assignor to Special Equipment Company, Portland, Oreg., a corporation of Oregon Application February 9, 1950, Serial No. 143,216

54 Claims. (Cl. 146—28)

This invention relates to the processing of fruit wherein a fruit having the characteristics of a freestone peach as distinguished from a clingstone peach is processed. In the present invention the process starts with the whole peach and the process comprises splitting the flesh of the whole peach substantially diametrically through and parallel to the suture plane of the peach, without severing or cutting the pit itself and then providing half fruit spreading means contacting the cut flesh of the half fruits shifting the thus formed peach halves or fruit halves away from the pit, the latter being preferably held so as properly to divorce each thus formed fruit half from the pit; utilizing this half fruit spreading means for depositing each half fruit in a holder thereafter while the peach halves are thus suitably supported in the holders, peeling the peach halves and thereafter discharging the peeled and pitted fruit free of the peeling, the peeling itself being discharged separately from the processed, finished fruit. This process is preferably carried out in an organized machine, power operated so that after the whole fruit is properly fed to a power operated mechanism the complete process is carried out automatically without further human intervention.

Among the objects of the present invention are to provide a fruit impaling or flesh severing structure which comprises a plate assembly for cutting and separating the fruit, together with associated operating means for shifting a fruit to be pitted and said plate assembly relatively to impale or sever the fruit to effect the bisecting thereof and to effect the separation of the severed fruit parts following the bisecting operation; to provide a completely automatic power operated machine for carrying out the process hereinbefore set forth; to provide means for pitting a whole fruit of the freestone peach type wherein the flesh of the whole fruit is severed from the pit of the fruit without cutting the pit and whereby to form two substantially identical fruit halves and wherein means is provided for contacting the cut faces of the fruit halves around the held fruit for discharging these fruit halves free of the pit into suitably formed spaced fruit receiving holders; to provide in combination with the foregoing, means for supporting the same fruit halves in the spaced fruit holders in a manner to permit the subsequent simultaneous peeling of these fruit halves free of their pit in the completely automatic machine hereinafter described; to provide a device for severing a whole fruit of the freestone peach type in a manner such that the flesh of the fruit is cut substantially diametrically therethrough and preferably directly through and parallel to the suture plane of the peach while at the same time the line of severance is formed closely around the peripheral outlines of the pit and substantially coincidentally therewith the pit is held while spreading means engages the cut faces of the severed flesh of the half fruit substantially around the held pit and then exerts pressure outwardly upon the cut faces of these fruit halves to separate them from the held pit and to discharge them into spaced fruit holding means for subsequent treatment; to provide in combination with the foregoing, mechanism acting in timed sequence therewith to not only eject the held pit from the pit holding mechanism after the fruit discharging operation has been carried out and/or also to eject the pit and/or bits of dislodged fruit flesh from the fruit half spreading mechanism so as to prevent any clogging or improper functioning of the mechanism upon processing of subsequent fruits; to provide in association with the half fruit spreading mechanism for discharging the half fruit into fruit holders as the half fruits are being separated from the held pit, means associated with the spreader mechanism for holding or clamping the half fruits to the spreader mechanism as the spreader mechanism is moved from a first position, adjacent the fruit splitting mechanism, to a fruit discharging position into the fruit holders, and for providing mechanism for automatically releasing the clamped fruits to permit them to be discharged into the half fruit holding mechanism; to provide mechanism operable independently of the movement of the fruit spreader mechanism for releasing the clamping mechanism; to provide mechanism operated automatically by the movement of the peeling head for actuating the clamp releasing mechanism whereby desired timing of the sequence of operations may be carried out independently of the actuation of the fruit spreading mechanism; to provide a novel type of mechanism for splitting and pitting a whole fruit wherein the plurality of splitting blades are operable to sever the flesh only of a whole fruit and wherein the severing blades are relatively shiftable toward and from each other so as to receive therebetween the pit of the whole fruit the flesh of which is being split or severed and wherein means is provided in association with the severing blades for firmly gripping the pit and more specifically, for firmly gripping the pit on opposite sides of the suture ridge of the pit; to provide a novel type of splitting and pitting mechanism for a whole fruit wherein a plurality of fruit halving or severing blades are provided which are relatively shiftable toward and from each other to receive therebetween the pit of the whole fruit the flesh of which is being simultaneously severed; and specifically wherein each of such blades are provided with marginal frontal cutting surfaces adapted to meet in a common plane and wherein certain of the cutting edges disposed in a common plane are provided with adjacent segmental cut-out portions or recesses, which recessed portions are provided with integral saw-like teeth, alternate teeth being beveled oppositely, the teeth lying wholly within the plane of the blade portion, and whereby said oppositely beveled teeth lying in the plane of the blade portion are adapted to straddle the suture ridge of the pit and to grip the opposite sides thereof whereby more firmly to hold the pit and prevent it from being pulled laterally as the severed half fruits are divorced from the held pit; to provide a pair of relatively shiftable fruit halving or severing blades for severing the flesh only of a whole fruit wherein the blades are formed with frontal edges lying in a common plane and sharpened to provide severing portions and are likewise provided with angularly disposed edge portions forming cutters which latter edge portions are located between the blades as the blades are moved relatively toward and from each other whereby a whole peach may be passed either manually and/or automatically across the frontal flesh-severing portions of the blades, the blades opening slightly during this feeding movement to receive therebetween the pit of the fruit the flesh of which is being severed and wherein portions of the cutting edges of the two blades are then brought toward each other whereby to impart a motion thereto causing such bladed portions to follow the border lines of the pit as it passes between the blades; to provide a mechanism in association with the foregoing wherein the blades are likewise provided with recessed portions to the rear of the flesh-cutting edges of the blades, which are adapted to receive the pit of the whole fruit therebetween as the flesh of the whole fruit is being severed, said recessed portions including means associated therewith for gripping the pit whereby to hold the same so that the severed fruit halves may be separated therefrom; to provide in association with the flesh-severing and pit-holding mechanism hereinbefore described, a pair of spreader mechanisms, more specifically disclosed as plates, which are positioned in the cut of the whole peach as the severing mechanism forms the cut, and around the severed pit in such a manner that after the severance is completed and the pit has been held, said spreader mechanisms then automatically operate to spread or push against the severed faces of the half fruits thus formed to divorce them from the held pit and/or thereafter to discharge the fruit halves with an uninterrupted motion onto fruit holding means, all in automatic sequence; to provide in combination with the fruit spreading blades, and with the pit holding mechanism, automatic means for wiping across the pit holding mechanism for ejecting any pit which inadvertently sticks to the pit holding mechanism after releasing of the pit holding grip and/or to wipe across the spreader mechanism to eject bits of fruit and/or any pit that has lodged upon the spreader mechanism during automatic operation of the device; to provide an organized turret-operated machine comprising a single turret carrying a plurality of pairs of fruit cups or fruit holders in spaced relation thereabout in association with means for automatically holding a whole fruit and preferably with its suture plane in predetermined position and for automatically feeding the held whole fruit toward a predetermined point or locus having a definite location midway between a pair of positioned fruit holders and wherein automatic means is associated with said point or locus and disposed in the path of movement of the said whole fruit for splitting the flesh of the same, for gripping the unsevered pit thereof, for discharging the half fruits formed by the severing operation from the held pit into the fruit holders, and/or for ejecting the pit from the pit-holding mechanism and/or from the fruit spreading mechanism including any foreign material tending to lodge thereon and for thereafter automatically moving away from the fruit holders whereby to permit the turret to thereafter carry the fruit holders away from said station and to position a new set of fruit holders thereat in a timed relation; to provide in association with the foregoing, a peeling station cooperating with the fruit holders moved by the turret thereto and containing the pitted half fruits and at which peeling station, mechanism cooperating with the half fruits supported on and by their curved surfaces in the fruit holders, is provided for contacting and supporting the cut surface of each half fruit and likewise is supportingly pressing downwardly upon the flesh of each half fruit at the pit cavity during at least a portion of the movement of an arcuate blade through the flesh of each half fruit just under the peeling whereby automatically and efficiently to peel each half fruit; to provide in association with the foregoing, other stations about the turret for discharging each pitted and peeled half fruit from the fruit holders leaving the peelings in the holder and thereafter for independently and sequentially scavenging the peelings from the holders so that the holders may cyclically be brought back to the first station for receiving freshly pitted, but not peeled, half fruits in the manner hereinbefore set forth; to provide these and other objects of invention as will be apparent from a perusal of the following specification when taken in connection with the accompanying drawings, wherein:

Figure 5 is a vertical section on line 5—5 of Figure 3;

Figure 6 is a right side view of the machine showing the fruit feeding mechanism;

Figure 7 is a side sectional view showing the fruit feeding and splitting station taken on line 7—7 of Figure 6;

Figure 8 is a front sectional view of the fruit feeding station taken on line 8—8 of Figure 3.

Figure 9 is a side sectional view of the fruit feeding station taken on line 9—9 of Figure 3;

Figure 11 is a vertical sectional view taken on line 11—11 of Figure 7;

Figure 12 is a vertical section taken on line 12—12 of Figure 7;

Figure 13 is an enlarged detailed sectional view taken on line 13—13 of Figure 11;

Figure 16 is a detailed perspective view of some of the associated parts of the machine, as shown in assembly in Figure 9;

Figures 17 and 18 are perspective views of the splitting and separating blades in closed and opened positions respectively;

Figure 19 is a detailed sectional view taken on line 19—19 of Figure 17;

Figure 20 is a perspective view of associated parts of the wiper blade mechanism;

Figure 21 is a perspective view of the associated parts of the fruit splitting mechanism;

Figure 22 is a perspective view of the fruit feeding cup;

Figure 3:
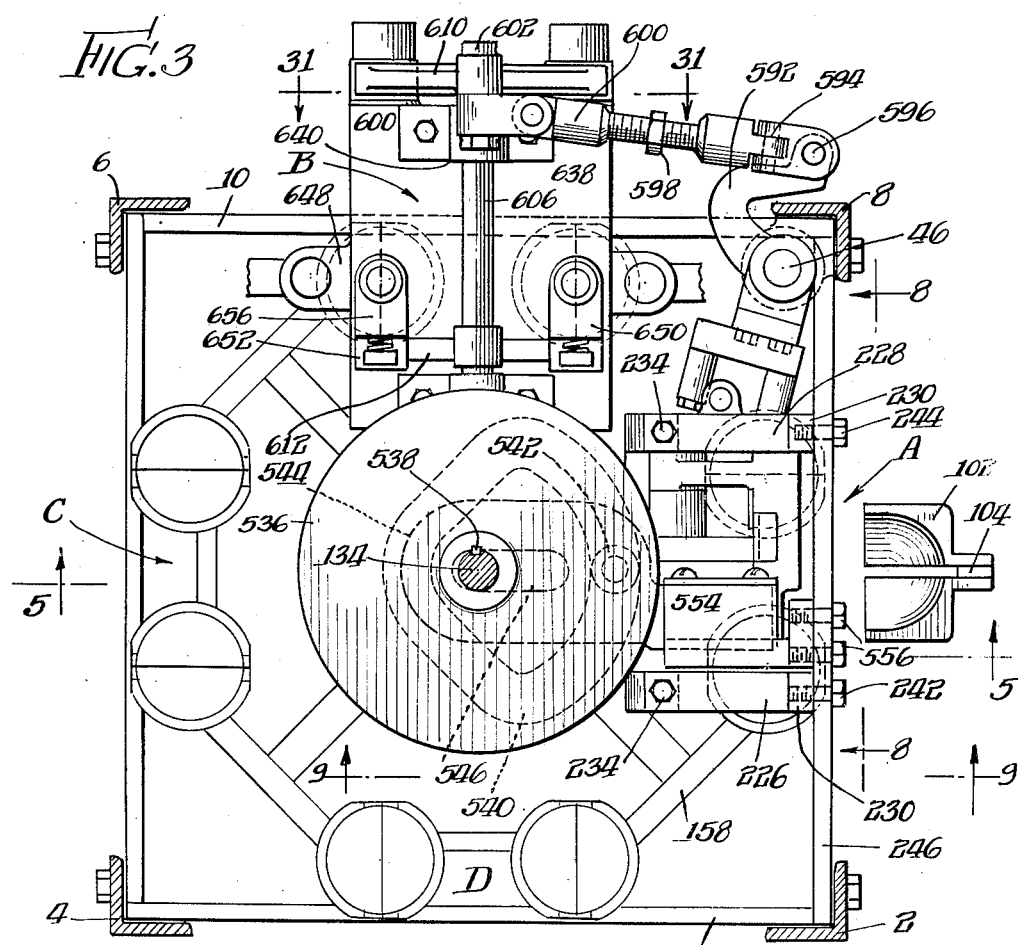
Figure 3 is a plan sectional view on line 3—3 of Figure 1.

Figures 23 to 30, inclusive, are views showing in consecutive order the treatment of the fruit as it enters, is split, separates, and is discharged from the separated blades, into the fruit cups;

Figure 31 is a cross sectional view of the peeling head taken on line 31—31 of Figure 3;

Figure 32 is a vertical sectional view of the peeling head taken on line 32—32 of Figure 31, showing the fruit cups in raised position;

Figure 33 is a detailed sectional view taken on line 33—33 of Figure 32;

Figure 34 is a fragmentary detailed sectional view taken on the line 34—34 of Figure 32;

Figure 35 is an enlarged sectional view showing the toothed portions of the fruit splitting blade in active position holding the pit of the peach;

Figure 36 is a section on line 36—36 of Figure 35;

Figure 37 is a view showing the fruit cutting blades taken on the line 37—37 of Figure 30;

Figure 38 is a sectional view taken on line 38—38 of Figure 24;

Figure 39 is a view of the plate or blade assembly or structure bearing, the plates each carrying flush cutting edges for cutting into the peach wherein the blades are shown in substantially a common plane.

Figure 40 shows a corresponding view but with certain of the plates or blades shifted to a position to discharge the peach sections away from the pit.

Figure 41 is a section taken on line 41—41 of Figure 39.

Figures 42–46, represent successive views of the assembly shown in Figure 39 illustrating the manner in which a peach and the assembly are provided with relative movement to cause the cutting edges of the plates to cut the flesh of the peach and to receive the pit between certain of the plates.

Figures 46–50, illustrate still another modification of the assembly and showing successive positions of the cutting plates and wherein a fork member is utilized to assist in holding the pit in position between certain of the cutting plates or blades.

Referring to the structure of Figures 46–49 inclusive Figure 46 shows a side view of a pair of the plates such as 812 and 813 with a fork 815 fixed in a stationary position opposite the recessed portion of the plates to assist in holding the pit. In this construction the blades 812 and 813 are sufficiently cut away as shown at 812a and 813a to provide room for the fork shank 815. Figure 49 is a plan sectional view taken on the line showing the mounting of the fork. The heads of the pivot studs 362 and 364 are drilled and tapped for screws 817 to support one end of the fork 815. In explanation one end of the fork 815 has an L-shaped bracket formed at right angles to the shank of fork 815, which L-shaped bracket has a foot 819 fastened by screws 817 and 818 on the heads of the pivot studs 362 and 364 which are supported by the bearing bracket 819.

In this view the bifurcated ends of the fork are located in registration with the semi-oval shaped recesses 823 and 825 of the two plates 812 and 813 respectively. So also in this form of device the peach is fed in with the stem end first so that the forks enter the fruit in the stem cavity and the forks do very little damage to the fruit. The fork centers and holds the pit during the pitting operation. The fork also helps the teeth on the blades 812 and 813 to keep the pit from following one of the half peaches as the latter are discharged by the separator plates.

In Figures 46–49 inclusive it is understood that the plates 812 and 813 are geared together and operated in the same manner as the former figures in the case and the same is true of Figures 42–46 inclusive.

Commenting upon the oval-shaped recess in the cutting blades 812 and 813 as compared with the shape of the recesses in Figures 39–40 it is to be pointed out that this oval shape of the pit clipping means further provides a better cutting of the flesh around the pit due to the fact that the oval conforms more closely to the shape of the pit.

Figure 1:
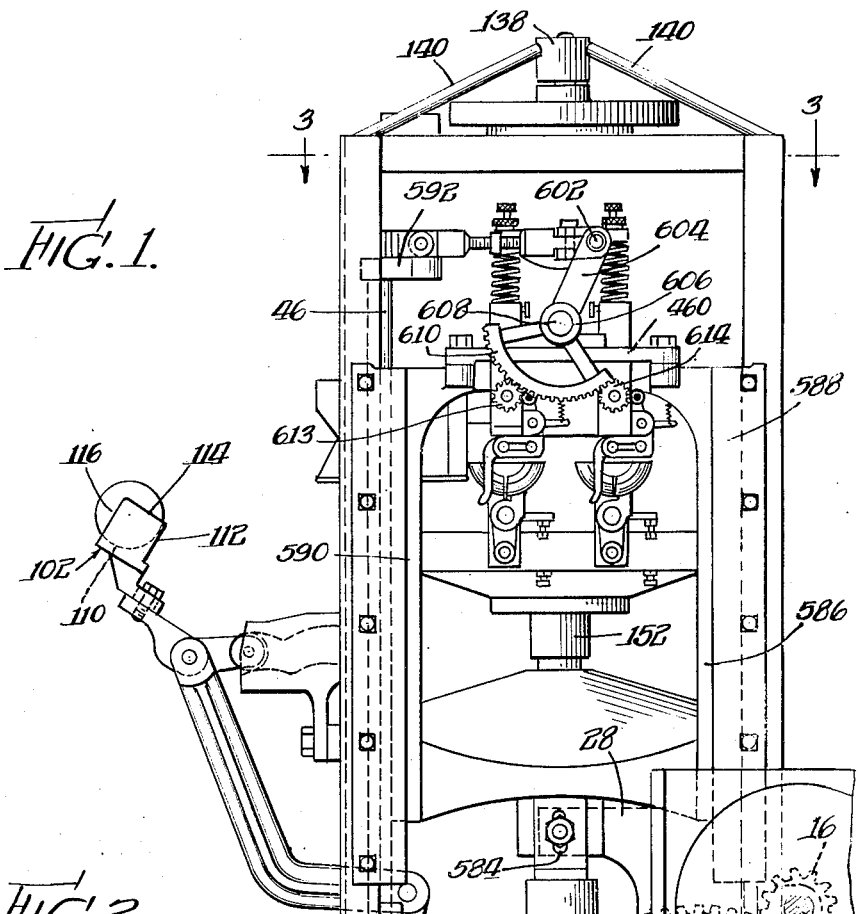
Figure 1 is a front elevational view on one side of the machine.
Figure 2:
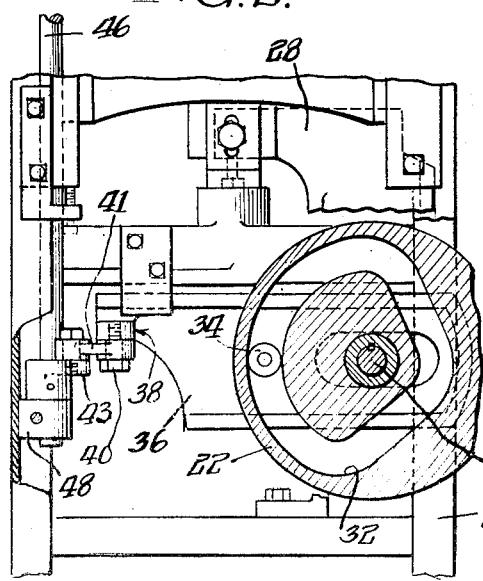
Figure 2 is a lower portion of the view shown in Figure 1 with the large gear and driving pulley removed so as to disclose the cam drive for raising and lowering the peeling head and for operating the peeling knives.

Referring now more particularly to the drawings, the machine as shown in Figures 1 and 3 comprises four uprights of substantially L-shaped formation, such as 2, 4, 6 and 8 with appropriate top and bottom cross supports 10 and 12, whereby to provide a rigid upstanding skeletonized elongated box-like structure or frame. At the lower portion of this frame there is mounted in suitable bearings fastened to the frame, the main power shaft 14 carrying a pinion 16 engaging with the peripheral teeth of a large gear 18 mounted on a parallel shaft 20 which likewise has appropriate bearings in the main frame. Keyed to the shaft 20 within the border of the uprights of the frame, as shown in Figures 2 and 6, is a cam disc 22 which on one face carries the cam track 24 (see Figure 1) in which is disposed for operation a cam roller 26 mounted on a vertically operating slide 28. This slide 28 is provided with a vertically disposed elongated slot 30 which straddles the shaft 20, whereby to assist in guiding the slide 28 in its vertical reciprocatory movements. This slide is designed for raising and lowering the peeling head hereinafter referred to.

In addition, the cam disc 22, on its opposite face, is provided with a second cam track 32 (see Figure 2) within which operates a cam roller 34 (see Figure 2), which roller is attached to a horizontal slide 36 having an outwardly extending lug 38 (see Figure 2) in the form of a collar carrying a pin 40, which pin supports a link 41, the outer end 42 being pivotally connected with a crank 43 connected to the lower end of a vertical shaft 46 mounted in suitable bearings 48 on the stationary frame. By interconnecting the horizontal slide 36 and the link 41 with the crank 43 the straight line motion of the slide 36 will cause the circular oscillating motion of the shaft 46 for the purpose of operating the peeling cutters in the manner hereinafter described.

In addition, keyed to the shaft 20, as shown in Figure 5, is a second cam disc 50 provided with a cam track 52 shown in dotted lines in Figure 5, in which operates a cam roller 54 connected to a second horizontal slide 56 having at its outer end a connection 58 to an adjustable arm 60 in turn pivotally connected as at 62 to a crank 64 which is keyed to a shaft 66 mounted pivotally in a bracket 68 rigidly mounted on the main frame of the machine.

The opposite end of this shaft 66 carries a collar 70 having a substantially L-shaped arm 72 as shown in Figures 5 and 6, the upper end of which is provided with an aperture 74 to receive a pivotal pin 76 which passes through the furcations 78 (Figure 22) of a bracket 80. In addition, the bracket 80 is provided with a rigid arm-like extension 82 which carries at its outer free end a cam roller 84 adapted to operate in a cam track 86 formed on the bracket 88 having a depending lug 90 bolted as at 92 to two of the vertical uprights 2 and 4 of the main frame. The upper end of the bracket 80 carries an upstanding guide 94 (Figure 22) and a threaded aperture 96 in which is slidably mounted a tongue 98. A bolt 100 serves to maintain the tongue in adjustable position relative to the bracket 80. This tongue 98, as shown in Figures 7 and 22, carries and supports the fruit receiver hereinafter described.

This fruit receiver has the function of manually receiving the whole peach which is placed therein by an operator and upon proper automatic operation of the L-shaped arm 72 the fruit will be positioned with respect to the mechanism in the machine as hereinafter described.

The upper portion of the bracket 98 carries the whole fruit receiver and positioning member for cooperation with the fruit splitting and half fruit separating mechanism hereinafter mentioned. This fruit receiver comprises a cradle-like holder 102. This fruit holder is shown in Figures 6, 7 and 22. It is open at the top and front so that a whole fruit such as a peach may be placed freely therein by the operator with the suture plane in a vertical position and directly overlying a vertical slot 104, which is formed centrally of and vertically through this holder. This slot extends rearwardly through the upper portion of the fruit holder bracket 98 sufficiently far so that when the fruit holder is given its maximum inward movement toward the fruit dividing or splitting and half fruit separating structure the forward edges of the latter as shown in dotted lines in Figure 7, and the front edges of the fruit separating mechanism will pass well into the slot in both the fruit holder 102 and the fruit holding bracket 98.

Figures 1 and 6 show the opposite extreme position of the fruit holder 102 at which time it is substantially removed from the frame proper.

It will be noted that the curved cradle-like inner wall of the peach holder, as shown in dotted line in Figure 7, extends from substantially the point 106 in curvilinear form to substantially the point 108, and that this curved wall portion has two wall components 110 which are spaced angularly from each other substantially 90 degrees, so that in the position shown, for instance, in Figure 7, the weight of the peach rests mainly upon the bottom wall 112, whereas the wall 110, which is then in vertical position, backs up and acts as a pushing medium for pushing the peach in a substantially horizontal plane across the vertical fruit knives.

In the position of the fruit holder 102, shown in Figure 1, these same walls 110 and 112 have been shifted to a position such that they each bear substantially one-half of the weight of the peach and furthermore due to the fact that the edges 114 and 116 of the fruit holder are open, in this particular position, as shown in Figure 1, the entire upper portion of the holder is open so that the peach may be freely placed therein by the operator from a position above the fruit holder, particular care being taken that the suture plane of the peach in the majority of cases is co-planar with the plane of the slot 104 through the holder. In the majority of cases the suture plane will pass centrally of or through the peach, whereas in other instances the suture plane will be to one side. However, this represents only a small percentage of peaches.

In order to permit a vertical adjustment of the bracket 98 in the guideway 94 in cooperation with the bolt 100, see Figure 7, and the threaded hole 96, the shank of the bracket 98 is provided with an elongated slot which permits of a limited range of adjustment of this bracket relatively to the carrier 80.

Due to the reciprocation of the cam slide 56 and its linkage connection 60 with the lever 64 and the pivotal axis 66, the fruit carrier operating arm 72 is swung about the horizontal pivot 66 in a vertical plane while at the same time the roller 84 mounted on the arm 82 has imparted to it the motion formed by the shape of the cam slot 86, thereby producing the following movement of the peach from the position shown in Figures 1 or 6 so that a center through the peach will move along the path shown by the dotted line in Figure 5 to the entering position shown in Figure 23 and from thereafter the peach will advance exactly in the pathway shown by the dotted lines in Figure 5, relatively to the vertical positioned fruit splitting blades hereinafter described.

*Driving mechanism for the central vertical shaft of the machine*

As shown in Figure 5, the horizontal shaft 20 has keyed thereto the bevel gear 118 which meshes with a second bevel gear 120 on the vertical shaft 122 having bearings 124 in the main frame of the machine. This vertical shaft 122 carries on its lower end a horizontally disposed pinion 126 meshing with an intermediate gear 128 mounted on a stud shaft 130 having bearings in the main frame. This intermediate gear 128 meshes with a third gear 132 pinned on a central vertical shaft 134. This shaft has a lower bearing 136 carried by the lower frame portion of the machine and likewise has an upper bearing 138 (see Figure 1), which is suitably supported by rods 140 connected to the four corners of the uprights 2, 4, 6 and 8. This central shaft has a plurality of functions. It provides a driving mechanism for the spreader blade wiping mechanism hereinafter described. It also, through appropriate mechanism, opens and closes fruit splitting blades. In addition, through appropriate mechanism, it operates the fruit spreader blades and the fruit holding clamps which cooperate with the spreader blades.

Driving mechanism for main fruit holding turret

Centrally of the main frame of the machine is located a turret which is provided with a plurality of spaced apart holders for receiving and holding fruit. Particularly the turret is provided with a plurality of spaced apart cup-like holders into which half fruit, in the present instance half peaches, are deposited from the splitting mechanism and the fruit spreaders which transport the split halves into the fruit cups.

The fruit turret intermittently transports the cups from the half fruit feeding station, such, for instance, as A, shown in Figure 3, and at which station the half fruits are deposited one in each cup with the cut face of the half fruit uppermost and exposed, to a second station, such as B (Figure 3), at which station peeling mechanism cooperates with the half fruits in the fruit holders to peel the half fruit. Subsequently the half fruits in the holders are transported to a station C where the peeled and pitted half fruits are discharged therefrom, leaving the peelings in the fruit receivers or cups. Next, the cups with the peelings therein are transported by the turret to a station such as D (Figure 3), where the peelings are scavenged from the cups, where by the next movement of the turret these cups are transmitted by such movement back to station A where additional pitted half fruits are deposited by the half peach discharge means specifically referred to as spreader mechanism hereinafter described where the half peaches are deposited in peach holders.

At the station A and operating in cooperation with the movements of the fruit cups which operate in spaced pairs, there is located a fruit impaling or flesh cutting structure comprising a plate assembly for cutting and separating the fruit preferably along the suture plane thereof while the pit is being held stationary. The separating mechanism functions to transport each pitted half fruit which is thus split by the splitting mechanism into a fruit receiving cup or other point of discharge.

Cooperating with each separating or half fruit mechanism is means for holding each half fruit on the spreader mechanism during the movement of the spreader mechanism from the fruit splitting mechanism to each fruit receiving cup. In addition, mechanism is present at this station A for operating the fruit impaling structure in such a manner that as the split or cut is formed through the flesh of the fruit, the pit of the fruit will be passed into position between portions of the fruit cutting mechanism in such a manner that the separating means or spreader mechanism moves each half peach away from the held pit and discharges the half fruits free of the pit.

Inasmuch as the present machine is designed for operation on freestone peaches, the separation of the held pit from each severed half of the peach is carried out with great rapidity and facility and without any appreciable tearing of the flesh of the peach halves. In addition, and more specifically, mechanism is present at this station A for removing loose pits or bits of fruit flesh from the spreading mechanism so as to prevent clogging or improper positioning of the fruit halves on the mechanism which transports the fruit halves from splitting position to the half fruit receiving holders.

Figure 4:
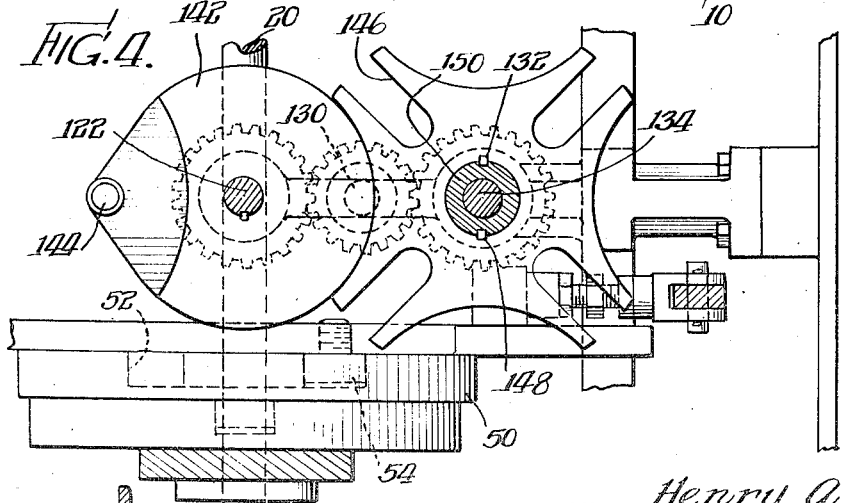
Figure 4 is a plan section on line 4—4 of Figure 5.

In order to carry out the foregoing functions, the vertical shaft 122, shown in Figures 4 and 5, has keyed on its upper end a Geneva disc 142 carrying the usual Geneva roller 144, which cooperates with the usual type of slotted Geneva wheel 146 keyed as at 148 at the bottom of an elongated vertically disposed sleeve 150 concentrically surrounding the central vertical shaft 134. The upper portion of this sleeve 150 is provided with an enlarged collar 152, which collar is provided with a circular platform to which is bolted a spider-like frame 158 (see also Figure 3), carrying a plurality of half fruit receiving and holding means herein specifically shown and illustrated as half fruit cups. These cups are arranged in four pairs about the periphery of the turret. The cups of each pair are disposed parallel with relation to each other. In other words, they are not disposed radially of the turret and as the cups are intermittently positioned at station A by the turret mechanism when they come to rest, a pair of cups is positioned so that each cup is an equal distance on opposite sides of a line passing centrally through the whole fruit receiving holder 102 as it arrives at its innermost position corresponding to the inward feeding movement of the whole fruit to the fruit splitting mechanism.

This, of course, also means that the two fruit receiving cups of the pair at station A are positioned on opposite sides of a line passing centrally through the fruit splitting mechanism and the fruit spreading mechanism when the fruit splitting mechanism is in a position juxtaposed to the fruit splitting blades, or on opposite sides of a plane passing through and parallel to the suture plane of the peach when being cut.

Also, in the present machine, when a pair of cups is positioned at station A or any other particular station, the cups then remain stationarily at such station and while thus stationary, the fruit processing mechanism of that particular station and in fact all stations immediately becomes operative to carry out the particular processing function of that station and in fact for all stations. Thereafter, the fruit processing mechanism will then swing out of the way and the turret will resume the transportation of a pair of cups to the next particular fruit processing station and at the same time will bring a pair of empty cups into position at station A, which is the station at which a fresh pair of fruit halves will be deposited into a pair of cups.

The construction and operation of the half fruit receiving cups is in accordance with the teachings of Ewald Patent No. 2,255,049, of September 9, 1941, except that the contour or shape of the fruit cups themselves in the present instance are designed for receiving and holding half peaches, as distinguished from the shape of the fruit cup of said Patent No. 2,255,049, wherein the fruit cups are constructed for receiving and holding half pears.

In Ewald Patent No. 2,216,165, of October 1, 1940, the cup mechanism per se is shown as designed in shape and construction for receiving half peaches. Therefore, the shape of the cups in the present machine would more closely resemble the shape of the cups in the latter Ewald Patent No. 2,216,165. It is to be understood, however, that the mechanism of the present machine, insofar as it functions to operate on peaches is concerned, differs from the mechanism of Patent No. 2,216,165, which latter patent is likewise designed for processing peaches.

Immediately above the top of the turret and disposed centrally thereof and surrounding the central vertical shaft 134, as shown in Figure 12, is a stationary sleeve 160. This sleeve 160 is shown in perspective in Figure 16 of the drawings. Within the upper and lower portions of the bore of this sleeve 160 are located upper and lower bearings 162 and 164 (Figure 10), which support the central vertical shaft 134 hereinbefore described. This shaft is supported in spaced relation from the stationary concentrically surrounding sleeve 160.

Figure 10:
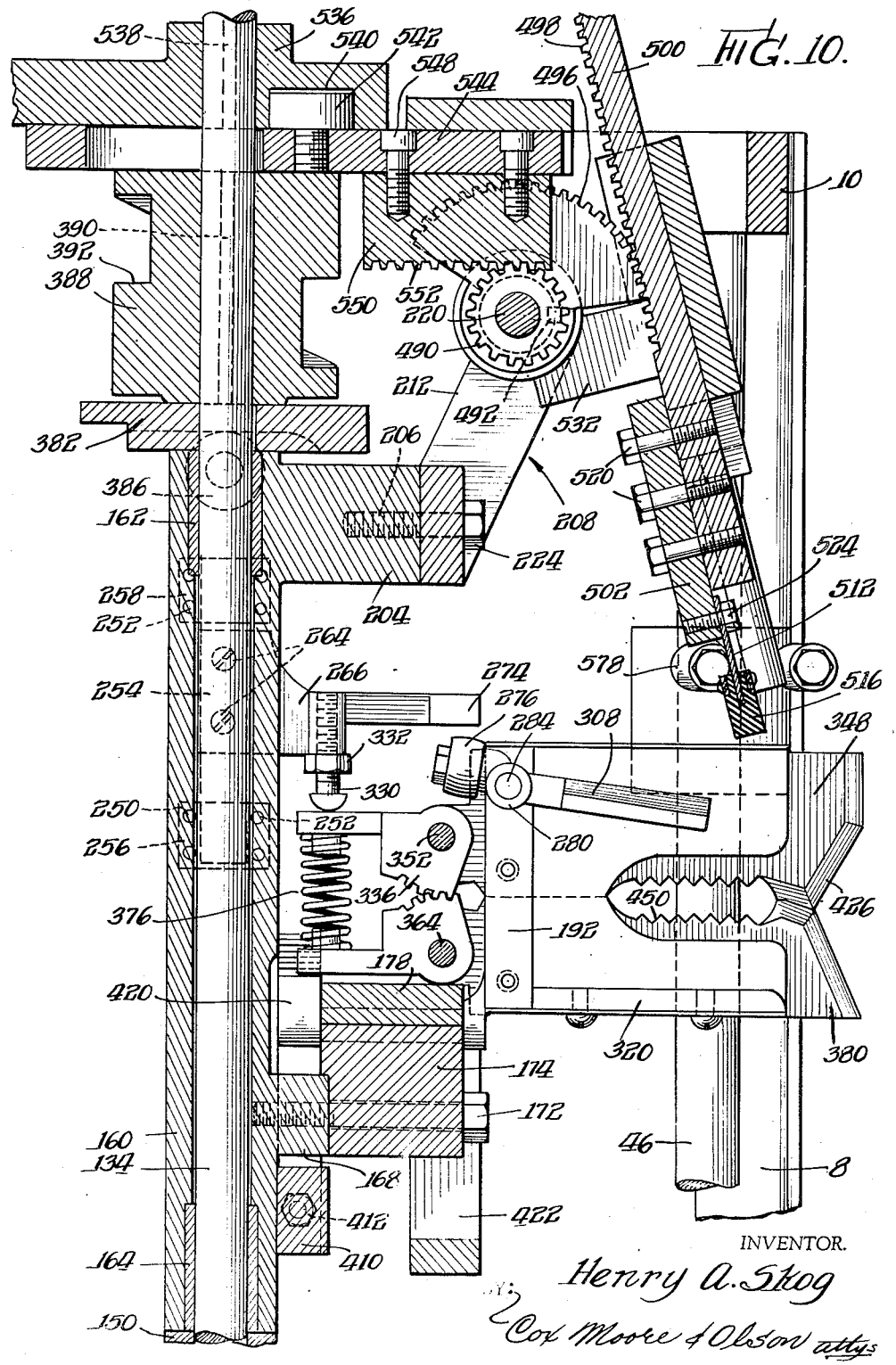
Figure 10 is a vertical sectional view taken on line 10—10 of Figure 8.

Returning now to the description of the sleeve 160, as shown in Figures 10 and 16, on a lower portion thereof it is provided with an integral mounting 166 carrying an integrally forwardly projecting smaller block-like mounting 168. This latter mounting has spaced threaded holes 170 adapted to receive elongated bolts 172 by which a bearing block 174 is rigidly mounted on the lower portion of this sleeve 160.

This block or mounting 174 is provided on its top surface for the full depth of the top spaced half bearings 176. This block is shown in perspective in Figure 16.

A cap 178 provided on its under-surface with complementary half bearings 180 is bolted onto the top of block 174 by means of the bolts 182 passing through registering bolt holes 184 into corresponding bolt holes 186 in the block 174. Mounted in the half bearings 176 and 180 formed by the block 174 and cap 178 are a pair of parallel shafts 188 and 190 (see Figures 17 and 18). Each one of these shafts carries on its outer end an arm 192 on which is mounted a spreader blade for transporting the split half peaches from the splitting mechanism and for depositing the half peach into a half peach receiving cup, as hereinafter described.

Referring again to Figure 16 and likewise to Figures 10 and 12, the upper end of the stationary sleeve 160 is provided with integral spaced apart lugs 194 and 196, each carrying on its outer face spaced threaded openings 198 and 200. The vertical space between these lugs 194 and 196 provides a vertical way for guiding a vertically reciprocating bar 202 about to be described.

In addition, the sleeve preferably directly opposite the lugs but on diametrically opposite sides of the sleeve is provided with a laterally extending block-like mounting 204 provided with spaced threaded openings 206 (see Figure 16), formed in one face thereof. This mounting 204 is arranged to rigidly carry a bracket 208 (see Figure 16) which bracket has at its two ends upstanding arms 210 and 212, the free ends of which are provided with two circular mountings 214 and 216 appropriately apertured as at 218 to receive a stationary shaft 220 (see Figures 10 and 14). The bracket 208 is provided with bolt holes 222 which register with the bolt holes 206 of the mounting 204 whereby spaced bolts 224 rigidly hold the bracket in position on the mounting 204 of the sleeve 160.

Additional means is provided for supporting the central sleeve and also for supporting the arms 210 and 212 of the bracket 208 and the stationary shaft 220 carried thereby. This means comprises a pair of arms 226, 228 (see Figures 3 and 16). Each arm is elongated and is provided on its front with an upstanding boss 230. The rear portion of the arm is provided with a vertical bore 232 to receive bolts 234 which pass likewise downwardly into threaded bores 236 and 238 in the bearings 214 and 216 for the shaft 220.

In addition, the bosses 230 of these arms 226 are provided with a forward horizontally disposed fitted opening 240 which receives these bolts 242 and 244, which bolts pass through a horizontal bracing or connecting bar 246 in turn connected to the uprights 2 and 6 at the corner of the stationary frame structure of the machine.

Figure 14:
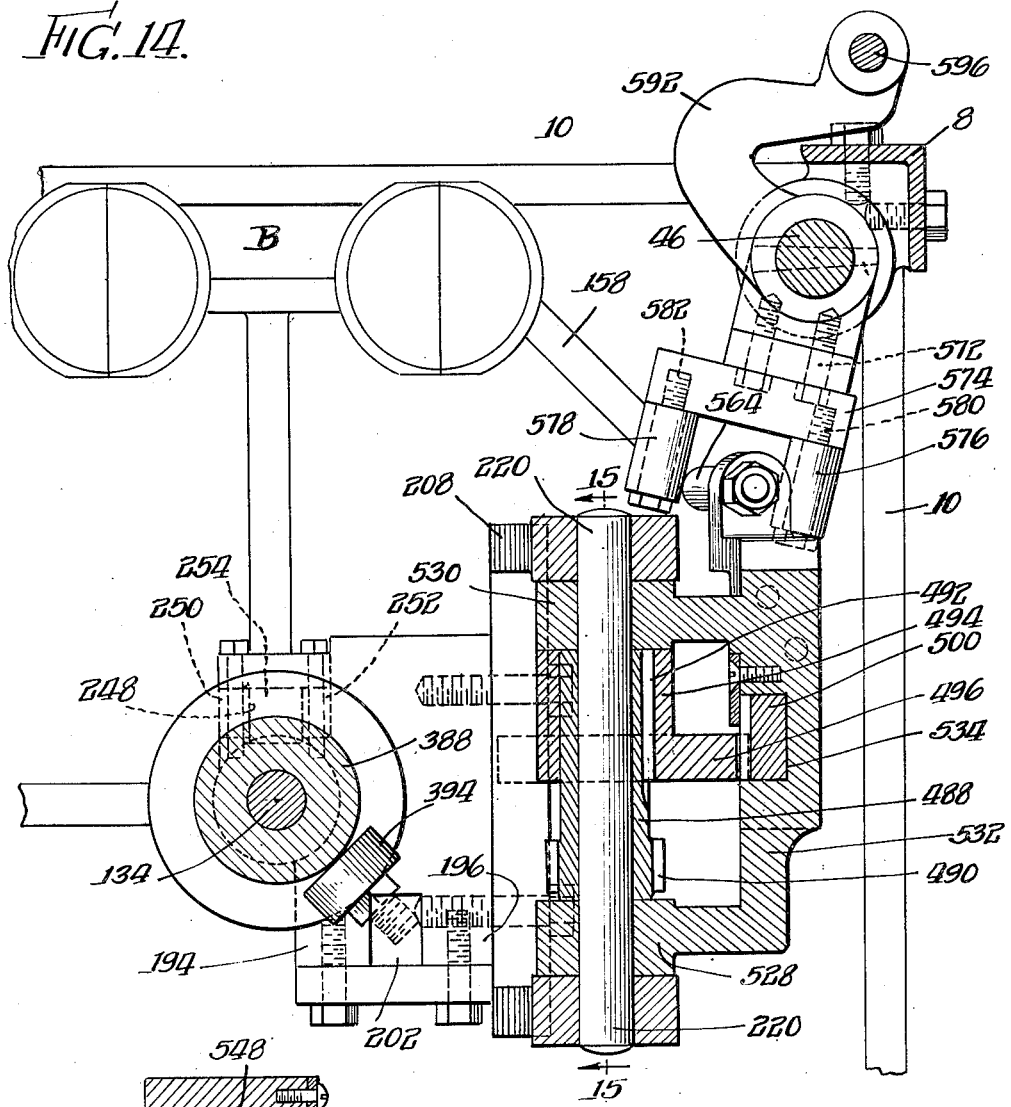
Figure 14 is a detailed plan sectional view taken on line 14—14 of Figure 9.

Referring again to Figure 16 of the drawings, and also to Figure 12, the sleeve 160 below the level of the mounting block 204 thereon is provided with a longitudinally extending guideway 248 which is formed by upper and lower spaced blocks 250 and 252, thereby to provide a vertical way or guide extending longitudinally of and parallel to the central axis of the sleeve 160, as best shown in Figures 12 and 14.

A bar 254 is slidably mounted in these vertical guideways for reciprocation longitudinally of parallel to the central vertical axis of the sleeve 160. A pair of plates 256 and 258 are fastened by bolts 260 and 262 into threaded openings in these blocks 250 and 252 whereby to hold the bar 254 reciprocably in the guideway above mentioned. The slidable bar 254 has bolted thereto as at 264 a bracket 266 (Figure 22) which extends laterally therefrom and is provided with an offset section 268 which is offset at right angles thereto, which section is in turn provided with another offset section 270 likewise offset at 90 degrees to the section 268. The junction of these offset portions is provided with a threaded bore 272.

The offset section 270 forms a T-head 274. This T-head provides an elongated abutment which in depressed position engages the rollers 276 and 278 (see Figures 7 and 13), which is laterally mounted on a collar 280 and 282, each one of which collars is mounted upon a shaft 284 and 286 journalled in the top portions of the bars 192.

To this end the upper portions of these bars 192 are each provided with a suitable opening into which the end of the shafts 284 and 286 are inserted and screws 288 and 290 pass through the spreader plates 292 and 294 and into a threaded opening in the shafts 284 and 286. In addition, there are two other screws 296 and 298 (Figure 18) in each spreader blade which threadedly engage each one of the bars 192 whereby rigidly to mount each spreader blade upon one of the bars 192.

In this manner when the vertically reciprocating bar 254, shown in Figure 12, is operated, it in turn through the elongated bracket 274, shown in Figure 20, the bracket will move down to contact the rollers 276 and 278 and lift the clamping bars 308 and 310 whereby to depress the rollers 276 and 278. On the outer ends of the shafts 284 and 286 there is pinned a collar 300 and 302, to one of which as at 394 is affixed one end of a coiled spring being fixed in the collar 280 whereby the spring has certain action herein to be described.

Upon each collar 280 and 282 there is a laterally projecting clamping bar 308 and 310, which clamping bar is normally spring pressed to position shown in Figure 19, that is, in a downward direction relatively close to the side walls of the spreader plate.

Each half peach discharge or spreader plate is preferably formed of sheet metal as shown in Figures 17, 18 and 19. Each one of these discharge or spreader plates is of generally rectangular shape and is provided along its top edge with an outwardly extending flange 314 and an outwardly extending bottom flange 316 and 318. On each one of the bottom flanges 316 and 318 there is superimposed an elongated bar 320 and 322, the outer end of which is curved downwardly as at 324 for the purpose of guiding the peach in its inward movement so that it would rest on top of this bar.

The central portion of the main wall of each separator or spreader plate is provided with an enlarged opening 326 and 328 which extends backwardly toward the rear portion of the sheet so that when the spreader plates are in position shown in Figure 17, that is, juxtaposed to the exterior opposed faces of the fruit slicing knives, the slots 326 and 328 will expose the meeting edges of the slicing knives as hereinafter set forth.

When the curved lower edge of a peach has been placed upon the bars 320 and 322, as shown in Figure 26, the abutments 274 will have been raised out of contact with rolls 276 and 278 (see Figure 7), whereby to permit the coiled springs 306 (see Figure 17) to depress the clamping fingers 308 and 310 into contact with the upper peripheral opposed surfaces of the half fruit as it lies upon the opposed bars 320 and 322 with the pit of the peach held in the jaws of the slicing knives as hereinafter described. Thus, the half peach will be firmly held on the outside opposite faces of each spreader plate. Of this more will be said later.

The threaded hole 272 in the bracket 266 (see Figures 10 and 21) receives a threaded screw 330 and an adjusting nut 332. The head of this screw is adapted to engage an arm 334 carried by a sector 336 pivotally mounted as at 338 on a bracket 340, the shank 342 of which is bolted to the block 174 by means of bolts 344 (see Figure 9). The sector 336 in the front has a notch 346 formed therein into which a blade 348 is inserted and rigidly held therein in any suitable manner as by welding, screwing or otherwise.

By reference to Figure 21 it will be seen that a threaded pin 350 carrying a bearing section 352 and a head 354 is inserted through a bore 356 in the sector 336 and the studs into a threaded opening 339 in the bracket 340, whereby the sector 336 may pivot about the sleeve 352 as an axis.

In addition, the sector 336 is provided with teeth 358 which engage with corresponding teeth 360 in a second sector 362 which is likewise pivoted about the sleeve portion 364 and the threaded pin 366 having a head 368 engaging through the bore 370 of the sector 362 and into the lower threaded opening 372 of the bracket 340, whereby the lower sector is pivotal around the sleeve 364. This sector 362 is provided with a lower extension 375 in opposition to the upper arm 334. Each one of these sectors is provided with a spring guide for holding a coiled spring 376 therebetween.

The sector 362 likewise has a slot into which the lower slicing knife 380 is permanently inserted. The spring 376 is arranged normally to force the blades 348 and 380 toward each other. However, this action is counteracted when the adjusting screw 330 upon reciprocation of the bar 254 moves the pin downwardly and contacts the upper inwardly extending arm 334 against the action of spring 376 and through the interconnecting gear 358 and 360 shifts the cutting blades 348 and 380 to open position, as shown in Figure 24.

The means for vertically reciprocating the bar 254 comprises a circular cam 382 (see Figure 12) which is pinned as at 384 to the vertical shaft 134. This cam on its undersurface has a contour which operates against a cam roller 386 to push the bar downwardly. Due to the action of the spring 376 in contacting the screw 330 on the bracket 266 on the lower end of the bar, the bar is returned to upward position.

Broadly considered, the present invention relates to a fruit impaling or flesh severing structure which comprises a plate assembly for cutting and separating the fruit, together with associated operating means for shifting a fruit to be pitted and said plate assembly relatively to impale or sever the fruit to effect the bisecting thereof and to effect the separation of the severed fruit parts following the bisecting operation.

In this broader aspect of the invention the fruit impaling or flesh severing means comprising a relatively flat plate structure including relatively movable parts located in one position in a suitably common plane and including a pair of knife edges forming fruit cutting means and a pair of associated plate portions forming fruit separating means. Associated therewith is means for shifting a fruit to be pitted and said plate structure relatively to sever or to impale the fruit and cause the knife edges to bisect the fruit to effect a cutting action thereon to move the associated separator plate portions between certain portions of the severed fruit parts. In addition there is present holding means for holding the fruit pit and means for effecting the separation of the plate portions relative to each other and relative to the holding means to effect the separation of the fruit parts following the severing thereof.

In a modification of the broad aspect of the invention there is provided a fruit impaling or flesh severing structure comprising a plurality of relatively flat plate-like members certain of which are arranged to be positioned in one phase of the operation, substantially in a common plane, certain of said plate-like members operating to form a cut in the flesh of the whole fruit sufficient to receive said plates, the construction and arrangement being such that certain of said plates contacting severed portions of the flesh of the fruit are shifted oppositely outwardly away from the zone of the held pit whereby to separate and discharge the peach or fruit halves free of the pit.

In another aspect of this modification of the invention, at least two of the plate-like members which are moved outwardly in opposite directions away from the held pit are likewise formed with cutting edges to cut and/or at least to assist in cutting fleshy portions of the whole peach whereby to facilitate the positioning of said plate members in the cut and so that flat portions of said plate can contact the severed facial portions of the cut fruit and so that said plate members upon proper action outwardly in opposite directions away from the pit will function to discharge the severed fruit halves free of the pit.

Another general aspect of the invention of the foregoing modified form of the invention resides in providing the plate-like members which are so moved to separate and discharge the peach halves, with not only frontal cutting edges but also with reentrant recesses adapted to receive the peach pit therein and wherein portions of the margins of said pit receiving recesses are sharpened or formed as cutting edges whereby to assist in cutting the whole peach at portions adjacent the margins of the pit.

And still another object of such modification resides in associating with the foregoing plate-like members so formed, an associate plate-like member or members, constructed and arranged to form complemental severances or kerfs in the flesh of the whole fruit and which latter members are likewise formed with pit receiving recesses and with means for holding a pit in said pit receiving recess during the peach section displacement and discharge operation.

In the more specific aspects of the invention I have illustrated one means for forming the cutting operation on the flesh of the whole fruit as a pair of complementary hinged blades hereinafter described having frontal cutting edges and recessed at their meeting edges to provide space between the blades into which the pit passes during the severing operation of the whole peach into half sections. The flesh is severed rather cleanly up to and around the pit, and preferably the inner edges of this recess in the abutting blades are formed with pit gripping portions. Associated with these blades are a pair of relatively flat and thin half fruit separator blades which are adapted to one position to lie snugly against the opposed faces of the abutting knife or cutter blades so that the separator blades or spreaders may lie in the kerf cut in the whole fruit by the cutting blades. And in this specific embodiment of the invention these spreader or separator plates are given a motion outwardly in opposite directions away from the cutting blades so that while pressing against the cut faces of the half fruits these separator plates operate to discharge said severed half fruits free from the pit.

In an alternative form of the invention these separator plates or spreaders are also provided with frontal cutting edges and a reentrant recess certain of the marginal edges of which are sharpened to cut kerfs in the peach as the latter is fed across said plates into position such that the pit lies in the reentrant recess of these plates. Thereafter these plates are then moved outwardly in opposite directions, pressing against the severed faces of the half fruits to discharge the fruit halves from the pit, the latter being during the facial portion of the flesh severing operation held between the jaws formed in the recessed portion of the cutting blades. In this construction the cutting blades and the separator plates lie juxtaposed in a substantially common plane while the whole peach and the structure are moved relatively to cause the peach to be cut not only by the blades but also by those cutting edge portions of the separator plates so that both the blades and the plates lie in the kerf thus formed. Thereafter the plates are moved outwardly to discharge the severed fruit halves free of the pit.

*Mechanism for oscillating the fruit spreading, separating and discharge blades or plates*

Means is provided for oscillating the fruit spreader, separator or discharge blades or plates whereby to shift them from a position in which the half peaches are mounted and held thereon to a position wherein they deposit the half peach sections in the cups, release the same and then return back to the first position to receive additional peach sections. This comprises a large circular cam 388 (Figs. 9 and 10) keyed as at 390 to the shaft 134. This cam has a cam track 392 in which operates a cam roller 394 mounted at the top of a relatively long vertically disposed bar 396 which bar is at its lower end adjustably connected as at 398 to a second vertically elongated bar 400 (see Figs. 9 and 12).

This bar 400 has formed on its inner lower face a series of teeth 402 which mesh with teeth 404 on a sector 406 which is mounted on the inner end of the shaft 188 (see Fig. 17). The bottom end of this bar 400 has bolted thereto as at 408 a spacing block 410 to which is likewise bolted as at 412 a shorter bar 414, the upper end of which as at 416 has teeth which engage with teeth 418 on a second sector 420 mounted on the inner end of the shaft 190 (see Fig. 17), whereby upon vertical reciprocation of the bar 396 and its connected bar 400 the two racks are operated in the manner described to oscillate the shafts 188 and 190 about their axes, whereby likewise to oscillate the arms 192 on the ends of these shafts to shift the spreader plate about the axes 188 and 190 from a normal vertical position, as shown in Fig. 19, wherein they are juxtaposed and in contact with the opposite exterior sides of the upper and lower vertically disposed slicing knives or blades 348 and 380.

*Means for opening the clamping bars to release the half fruit into the fruit cups*

Means is provided at the discharge position of the spreader plates 292 and 294 as shown in Fig. 18, in which position they are horizontally positioned directly over the fruit cups, as shown in Fig. 8, to release fruit clamping bars 308 and 310.

In the present instance this comprises a bracket 422 (see Figs. 17 and 18), which, as shown in Fig. 7, is bolted as at 424 (as shown in Fig. 32) to the vertically rising and falling peeling head 460 as at 462. This bracket 422 is designed so as to be positioned below the horizontal position of the spreader blades 292 and 294 in the position in which they are shown in Fig. 18. The extreme lefthand end 464 of the bracket 422 is horizontally disposed and is provided with a threaded opening in which a bolt 466 is screwed. This bolt taken through an elongated slotted opening 468 in a horizontal portion 470 of a cam 474, has an inner diagonal face 476 which is adapted to contact the roller 276 of the peach clamping device 308. In addition, as shown in Figs. 11 and 32, the peach peeling head 460 is provided with a threaded bore 478 receiving a bolt 480 passing through an elongated slot 482 in a bracket 484 having an upstanding finger provided with a cam surface 486 which directly lies in the path of the roller 278 of the clamping finger 310, whereby as the spreader blades each carrying a half peach on its outside surface and held firmly thereon by the lower edge of the peach resting upon the ledges 320 and 322 and the upper edge of the peach gripped as shown in Fig. 19 by the clamps 308 and 310, descends to horizontal position, the clamping blades will remain in clamping position until the peeling head 460 rises sufficiently so that the cam surfaces 476 and 486 on the bracket 422 contact the rollers 276 and 278 of the clamping fingers whereby to release the clamps 308 and 310 to cause the half peaches to drop into the cups, as shown in Fig. 8, before the spreader blades 292 and 294 start their vertical swing upwardly.

In short, the clamping fingers are released by means which moves prior to and independently of the upward movement of the separator or spreader blades. The adjustment slots of the cam fingers 474 and 484 permits an adjustment for timing the releasing of the half peaches from the spreader plates relative to the time of upward movement of the spreader plates themselves.

The half fruit separator and discharge plates or blades in association with the plate-like blades 348 and 380 provide and comprise mechanism for forming a severance through the flesh of the whole fruit to bisect it, preferably substantially at or in a plane parallel to the suture plane of the peach or like fruit and to effect the separation of the severed fruit sections free of and from the fruit which is held by associated means.

Various arrangements of devices are within the contemplation of this invention for accomplishing the foregoing functions. In the following specification I have disclosed two or three alternative constructions for carrying out the broad objects of the invention.

I shall first described a construction set forth in Figs. 1 to 38 of the drawings.

*The fruit halving and pitting mechanism*

In the more specific embodiment of the invention, means is provided in association with the inward feeding movement of the whole peach and the whole fruit, as by the feeding holder 102, for impaling or severing the flesh of the peach through the suture plane of the whole peach or on a plane parallel to and closely adjacent the suture plane of the peach so that the line of severance follows closely the border line of the pit and without contacting the hard surface of the pit, whereby to maintain the sharpness of the flesh cutting blades and in a manner such that the flesh cutting blades themselves act as means for receiving the pit therebetween and for firmly gripping the pit, preferably on opposite sides of the ridged portion of the pit. In addition, means is provided such as the spreader blades, disposed and operable so that during the cutting operation they are positioned adjacent and in the line of cut of the flesh of the fruit and between the cut halves. And they are spread oppositely away from each other or are in a sense opened, so that they will force the two halves simultaneously away from the held pit of the freestone peach without tearing the flesh or otherwise disfiguring the flesh at the cavity of the pit and will then deposit the severed halves into the spaced fruit receiving cups.

In the present illustrated embodiment of the invention, the flesh severing blades 348 and 380 are each provided on their front ends with cutting edges that are somewhat V-shaped. Referring to Figure 20, the cutting edge 428 of the lower blade is formed on a diagonal relative to the path of movement of the whole peach as it is fed by the fruit holder 102.

In addition, the upper cutting edge 426 is on a reversely disposed diagonal relative to the path of movement of the peach so that these two cutting edges make a slicing cut through the flesh of of the whole fruit. Figure 23, for instance, shows a subsequent position of the whole peach as the front thereof passes inwardly across these diagonal cutting edges 426 and 428. It likewise shows the entering end 430 of the pit itself as having hollow ridges at the innermost ends 432 and 434 of these diagonally disposed slicing edges 426 and 428. In this position (Figure 23) the upper cutting blade 348 and the lower cutting blade 380 had started to move outwardly so as to provide a greater opening between the lowermost portion 432 of the front edge of the upper cutting blade and the portion 434 of the front cutting edge 428 of the lower cutting blade 380.

Figure 24 shows a position such that the blades 348 and 380 have moved to an even greater relatively open position. In this position the whole peach and its pit have advanced still farther. It will be noted that the cutting edge 436 at the bottom of the front slicing edge 426 is formed diagonally upwardly and thence is for a short distance formed slightly downwardly as at 438 at which point it is then formed inwardly upwardly as at 440 and merges with a series of downwardly depending inwardly formed saw-like teeth 442. The lower blade 380 beginning at the line 434 thereon is formed for a short distance diagonally inwardly and upwardly as at 444 and thence for a short distance as at 446 is tapered substantially horizontally and thence is cut downwardly as at 448 to join a series of bottom saw teeth 450 which act in opposition to the upper saw teeth 442.

By reference to Figure 37 it will be noted that the edges 436 and 444, which in Figure 17 are brought together, lie in a common vertical plane. In short, these edges are not laterally staggered relatively to each other. They do not overlap and this is likewise true of the front cutting edges 426 and 428 and also of the edges 438 and 446.

As shown in Figure 24 by the position of the pit and the cutting blades 348 and 380, it will be seen that the cutting surface 444 by reason of its rearwardly inclined taper is arranged to follow the lower peripheral contour of the pit as the pit moves somewhat arcuately toward a position between the saw teeth 442 and 450. In this position the blades are still moving in opposite directions toward a more open position.

In Figure 25 it will be noted that in the cycle of movements the blades 348 and 380 have now started to approach one another so as to follow the converging contour of the rear portion of the pit as it moves inwardly between the blades and in this position the cutting edge 438 and the portion 446 of the upper and lower blades are shaped so as to follow this converging contour as the blades come together and as the pit moves inwardly.

The pit will continue to move inwardly and the blades will continue to come together until the portion of maximum diameter of the pit contacts the upper and lower saw teeth against the tension of the spring means 376 which is tending to close the blades one upon the other. Hence the pit is resiliently gripped and held by the upper and lower saw teeth. At the same time the front cutting edges of the blades have sliced around the rear end of the flesh of the incoming peach closely following the contour of the pit thereof and without actually contacting the hard pit.

Figure 26 shows a pit held between the upper and lower saw teeth. In Figures 35 and 36 the saw teeth are shown enlarged. These teeth are ground so that the alternate teeth are beveled in opposite directions. For instance, tooth 442A is beveled, as shown in Figure 35, in one direction while the next adjacent tooth 442B is beveled to face in just the opposite direction. This produces a tooth structure cooperating with the suture ridge of the pit in the manner shown in cross-section in Figure 36 wherein the adjacent teeth 442A and 442B lie on opposite sides of or straddle the suture ridge of the pit. This same construction is present on the lower teeth 450A and 450B.

Thus, by grinding the saw teeth alternately, oppositely beveled, but still lying within the planes of the saw blades 348 and 380, a firm gripping of the pit is provided since the saw teeth alternately lie on opposite sides of and grip portions of the pit laterally of the suture ridge of the pit. Hence, the pit is firmly held from lateral movement and particularly is it thus held during the time that the spreader blades engaging behind the cut surfaces of the half peaches, subsequently move outwardly in opposite directions to separate the peach halves from the held pit.

By reference to Figures 25 and 26 it is to be explained that the upper and lower blades 348 and 380 extending from the inner terminal point 452 of the upper saw teeth and the lower terminal point 454 of the lower saw teeth, to the respective inner ends of the upper and lower blades such as the blade edge 456 and 458 all lie in a common vertical plane.

It is to be noted by reference to Figures 17 and 19, that when the spreader blades 292 and 294 shift to a vertical position, they are positioned as shown in Figures 17 and 19 with their vertical faces directly contacting the vertical opposed outer faces of the two slicing blades 348 and 380 so that as the whole peach is fed forwardly as for instance in Figure 23 across the front cutting edges 426 and 428 of the upper and lower slicing blades the two then vertically situated spreader blades will enter the slicing cut formed by the front edges of the slicing blades and then as the peach continues to be moved rearwardly of the slicing blades as in Figures 24, 25 and 26, the cut halves will be passed on opposite sides of the exterior vertical surfaces of the spreader blades and the pit will enter the saw tooth opening between the slicing blades and the opening 326 of the spreading blades.

The spreader blades remain in downward or horizontal position as shown in Figures 8, 18 and 27, until some time after the cutting blades 348 and 380 have started their opening movement whereby to release the grip of the saw-like teeth or other pit holding means carried by these blades from the pit so that the pit will fall downwardly free of the teeth and in the majority of cases onto the faces of the spreader plates which are opposite to the facial portions thereof which carry the fruit halves.

In certain instances it may be possible that the saw teeth of either of the upper or lower cutting blades 348 and 380 may sufficiently penetrate the pit so that the pit will adhere to one or the other of the upper or lower sets of teeth, in which case the pit will remain in the position shown in Figure 27.

*Pit ejecting and spreader blade wiping mechanism*

Means is provided for not only positively removing any pit which adheres to the tooth members of the cutting blades 348 and 380 and/or for also sweeping or cleaning the reverse surfaces of the spreader plates when the latter are in their downward or horizontal position, whereby all refuse is removed from the cutting and pitting mechanism before the next slicing and pitting action and spreader plate action takes place.

In the present instance the shaft 220 has loosely mounted thereon a relatively long sleeve 488 (see Figures 14 and 15), one end of which preferably integrally carries a pinion 490. The opposite end of this sleeve 488 carries a keyway 492 to which is splined a hub 494 on which a tooth segment 496 is integrally formed. The teeth of this segment mesh with the teeth 498 on an elongated rack bar 500, whereby the rack bar is reciprocated by means of the tooth segment.

Means is also provided for oscillating this rack bar during its reciprocation whereby two distinct movements are imparted to the rack bar. The rack bar 500 at its bottom carries a bifurcated yoke 502 (see Figures 10 and 20), the two furcations of which 504 and 506 have attached thereto as at 508 and 510 two spaced flexible metal plates 512 and 514, to the bottom edges of each of which are suitably clamped by screws or the like two rubber wiping blades 516 and 518.

As shown clearly in Figure 8, the rubber wiping blades 516 and 518 lie on opposite sides of the vertically disposed slicing blades 348 and 380. In short, the rack bar carrying the bifurcated yoke 502 having the wiping blades 516 and 518 on its bottom spaced apart portions straddles the vertical plane of the slicing blades and is oscillated in this plane when the spreader plates are in their down or horizontal position after this wiping motion which carries the rubber wiping plates across the upper top faces of the spreader blades in the down position, forwardly and, backwardly thereof, when the rack bar has moved upwardly to clear the upward movement of the spreader blades.

Figures 27 to 30 show the wiping movement of the yoke 502, and Figures 29 and 30 show the manner in which the wiping bars 516 and the rack 500 are raised so as to permit the spreader plates to move to their upward vertical position juxtaposed to the slicing blades. The bifurcated yoke 502 is bolted to the bottom of the rack bar 500 by means of the bolts 520 which pass through appropriate holes 522 in the yoke (see Figure 20) and in like manner the flexible blades 512 and 514 are bolted to the bottom of the yoke 502 by means of bolts 524 and 526.

Figure 15:
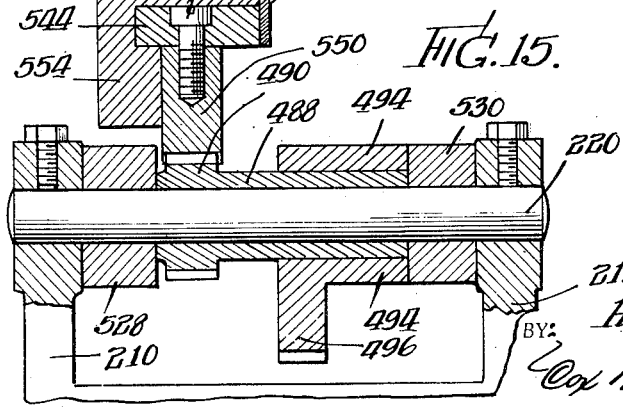
Figure 15 is a detailed sectional view taken on line 15—15 of Figure 14.

Means is provided forming a guideway for the reciprocatory movement of the rack bar 500. This is shown in Figure 16 as comprising two substantially circular spaced apart bearings 528 and 530, as shown in Figures 14 and 15. These are loosely pivotally mounted on the shaft 220 and they have integrally formed therewith a connecting yoke 532 formed with the guideway 534 in which the rack bar 500 is adapted vertically to reciprocate.

Means is provided for rotating the pinion 490 on the shaft 220 comprising a cam 536 keyed as at 538 to the vertical shaft 134 (see Figure 10), which cam has a cam-way 540 in which is disposed a cam roller 542 carried upon a slotted plate 544 (see also Figure 3) having a central opening or slot 546 which receives the shaft 134, whereby to guide this plate in a horizontal reciprocatory motion. One end of this plate has bolted as at 548 a rack block 550 having teeth 552 on its under-surface engaging with the teeth of the gear 490, whereby on rotation of the shaft 134 the slide 544 is reciprocated to alternately rotate the gear 490 whereby to oscillate the rack 500 vertically in its slide 534 as hereinbefore described. The outer end of the slide 544 is guided in a slide-way formed in the upper bracket 554 as shown in Figure 16. This bracket 554 is rigidly attached as at 556 to the main frame of the machine (see also Figure 3).

Likewise attached to the under-surface of bracket or yoke 532 is a smaller bracket 558 (see Figure 16) which carries a lug 560 having a perforation into which is threaded as at 562 a pin 564. This bracket 558 is secured to the yoke 532 by means of the bolts 566 (Figure 8) and the pin is secured in the opening of the lug 560 by means of a nut 568.

The vertical shaft 46 shown in Figures 1 and 3 in the corner of the standard is provided near its upper end with a collar 570 pinned thereto (see Figure 8), which collar has a flat portion to which is bolted as at 572 (Figure 14) a plate 574 carrying spaced rollers 576 and 578 on the studs 580 and 582. These rollers receive therebetween the pin 564 (see Figure 8) which depends from the bracket 558 on the block 532 (Figure 16). Therefore, in the oscillation of the shaft 46, due to the reciprocation of the slide 36 by the cam mechanism 24 (see Figure 2), the two rollers likewise oscillate the pin back and forth whereby to rock the bracket 532 forming the guide for the rack bar, about its axis 220, whereby to reciprocate the wiping mechanism carried by the bottom of the bar while at the same time not interfering with the raising and lowering movement of the wiping mechanism due to the operation of the segment 496 which cooperates with the teeth 498 on the rack bar.

In the operation of this wiper bar mechanism it will be seen that the combination of the vertical movement of the rack bar and the oscillating movement of the rack bar due to the rollers operating upon the pin 564 and shifting the carriage 532 about the axis 220, there is produced the following movement: the edge of the wiper 516 contacts the upper surfaces of the two separator blades 292 and 294 in their down horizontal position. As shown in Figure 8, the wiper mechanism 516 thus sweeps forwardly across each horizontal separator blade whereby to clear it of pieces of peach flesh and pits.

When the wiper blade has completed its movement across the face of the spreader plates (see Figure 28) it then raises due to the reversing movement of the pinion and segment 496. The raising of the wiper blade is accomplished by the reversing of the segment gear as stated, but the reverse backward movement from the position shown in Figure 28 to the position shown in Figure 29 is caused by the action of the roller 576 and the pin 564 (see Figure 14).

During this movement the wiper mechanism has been carried backwardly toward the rear portions of the cutting blades and spreader plate mechanisms but in a position clear thereof and overlying the same. In this position the next movement of the rack bar mechanism is to bring the wiper bars downwardly toward the spreader blades. However, in the meantime the spreader plates will have moved from a vertical position, in which position fresh peach halves have been deposited by the whole peach holder 104 so that when the spreader plates move downwardly to horizontal position the wiper blade will in timed relation therewith be moved downwardly upon the rear portions of the spreader plates and then will sweep forwardly across the top faces thereof to clean the same of any foreign matter and any pits.

Peeling

After the severed and pitted peach halves have been dropped in the pair of cups underlying the peach feeding station as shown in Figure 8, and the spreader blades have been lifted to clear the peach cups containing the peaches, the turret then makes its next intermittent movement whereby to carry the two peach halves to the peeling station B, as shown in Figure 3. The peach peeling head is mounted for vertical movement at this station and as heretofore mentioned in connection with Figure 1 of the drawings, it is vertically reciprocated by the slide 28 and this slide 28 through a vertical adjustment 584 hereinbefore described in connection with certain Ewald patents serves adjustably to operate the main vertically reciprocable peach peeling slide 586 which slides in opposed guide-ways 588 and 590 mounted on opposed corner posts 2 and 4 of the frame. The vertical corner shaft 46 carries at its upper end a link 592 connected to a universal connection 594 in turn connected by a pin 596 in turn connected to an adjustable link 598, which link at its opposite end has another universal connection 600 connecting with a drive pin 602 which is mounted on the upper end of a lever 604 (see Figure 1).

This link carries on its bottom portion a collar 608 adapted to swing about a horizontal shaft 606. This collar in turn carries a toothed sector 610 which gears with two pinions 613 and 614 rotatably mounted on the main peeling carriage 460.

The horizontal shaft 606 extends rearwardly and has on its opposite end a collar 616 which carries a toothed sector 618 meshing with a similar pair of pinions 620 and 622. These pinions 613, 614, 620 and 622 are mounted on stub shafts 624 and 626 carried on the peach peeling carriage 460.

The inner ends of these shafts 624 and 626 carry blocks 628 and 630 to which are connected as at 632 and 634 the peeling knife 636 of arcuate conformation suitably shaped to peel the type of peach desired, in the present instance the freestone type of peach. The forward edge of this knife is suitably beveled and sharpened for this purpose.

It will thus be seen that the knife is driven from both ends. The peeling carriage likewise carries means for retaining the half fruit in the fruit cup during the peeling operation whereby to prevent it tilting laterally as the peeling knife passes through the flesh of the fruit to make the paring cut and in addition carries means for preventing the adhesion of the peeling pad or means that prevents the half peach from tilting in its cup with the cut face of the half fruit when the peeling carriage is lifted away from the face of the half fruit. This mechanism is preferably of the construction shown in Ewald Patent No. 2,242,243, issued May 20, 1941.

The peach peeling carriage is provided at its upper end with an upstanding plate-like bracket 638 which is horizontally disposed and is of substantially oblong shape (see Figure 3). A pair of peach peeling pads is mounted for vertical reciprocation on and relatively to this plate 638 and each pad is adapted directly to overlie and cooperate with a fruit receiving cup and with a peeling knife which is adapted arcuately to swing through each cup.

This plate 638 also provides opposed bearings 640 and 642 for the shaft 606, hereinbefore mentioned. These bearings are bolted as at 644 and 646 to the top of the plate. As hereinbefore mentioned the two ends of these shafts carry the two sectors 610 and 618 and are simultaneously driven by the lever mechanism 604 and 602 from the corner vertical shaft 46.

Each one of the sectors 610 and 612 meshes with and drives the pair of gears 613 and 614 and 620 and 622, which gears are mounted in pairs on the opposite ends of the knife oscillating shaft and by means of which two pairs of peeling knives are driven simultaneously and at both ends thereof.

It is understood that in the present arrangement the peeling head is vertically reciprocable and is brought down upon a pair of cups to position two peeling pads, one directly upon the cut face of the fruit in each cup and at the same time the peeling head also positions two peeling knives directly at the mouth of the cup in position so that when the peeling knife is arcuately movable it will swing through a cup. These will be two knives swinging simultaneously through two cups in association with the two pads.

As before stated there are a pair of pads 648 and 650 for each cup. These pads are adapted to be positioned against the cut face of each half fruit while in its cup so as to prevent the half fruit from tilting laterally in a cup as the peeling knife passes through the flesh of the fruit while held in the cup. Each pad mechanism comprises an upstanding bracket 652 bolted as at 654 to the top of the plate 638.

This bracket has at its upper end a laterally extending horizontal arm 656 having a threaded opening 658 through which passes a threaded bolt 660 having a knurl head 662. In addition, there is a locking nut 664 which threadedly engages the threaded bolt 660 to hold it in any adjusted position. The bottom of the bolt 660 seats into an opening in a spring collar 666, around which coils the upper end of a coil spring 668. The bottom of this spring is adapted to coil around a vertically disposed sleeve 670, which sleeve 670 is mounted in a sleeve-like bearing 672, in turn mounted in an elongated vertical bearing 674 in the plate-like top 638. A pin 676 engages a semi-circular bore in sleeve 670 and likewise in a pawl plate 678 whereby said pawl is held from turning with respect to the sleeve 670.

The outer end of this pawl plate 678 has a pawl 680 attached thereto as by means of a screw 682. The sleeve 670 is provided with a hollow interior 684 and terminates at its bottom in a substantially circular pad 648, which in cross-sectional dimensions is shaped to conform to the cross-sectional dimensions of the particular size of half peach to be processed in the machine, except that a margin or space is left between the peripheral end of the pad and the inner wall of the cup through which the peeling knife may swing.

Reciprocably mounted within the hollow interior of the sleeve 670 is a relatively long stem 686 which on its bottom end is provided with a relatively smaller circular pad 688. A collar 690 is pinned as at 692 to this stem 686 near the bottom thereof and a second relatively weaker coil spring 694 is confined between the collar and the upper end of the hollow portion of the sleeve 684, whereby the spring by engaging the collar tends normally to force the smaller circular pad 688 downwardly away from the under-surface of the pad 648.

When the peeling head is first brought down onto the cut face of a half fruit in a cup, the smaller pad 688 will be forced upwardly into the counter-sunk recess in the main pad 648 against the tension of the spring 694. Next, the main pad 648 will be brought into contact with the cut face of the half fruit, the spring 668 yielding. This will means that the sleeve 670 will likewise yield upwardly and carry it the pawl block 678. This means that the pawl 680 will likewise rise vertically.

Mounted on the pair of upstanding brackets 656 (see Figures 31 and 32) are a pair of bearings 696, in which is rotatably mounted a shaft 698. Mounted in spaced relation on the shaft 698 are two pairs of hubs 700 side by side, each provided with a downwardly depending ratchet 702 having alternately staggered teeth which are adapted to be moved out of the path of the pawl 680. Means is provided at stated times for projecting the two ratchets into locking engagement with the pawl 680 in any desired position of vertical adjustment which the pawl 680 has been moved to due to the rise of the pad 688 contacting the cut face of the half peach so that when this means is operated the pawl will be locked in any such position so as to hold the pad firmly down in contact with the cut face of the half fruit.

The means preferred comprises a collar 704 pinned as at 706 on the shaft 698. This collar 704 carries a roller 708 adapted to cooperate with a cam 710 mounted on the shaft 606. The roller moves into engagement with the cam by reason of an arm 712 integral with the ratchet arm 702 on the shaft 698, between which and a cut-out 714 on the bracket 656 a coil spring 716 is confined. By reason of the foregoing when the pad 648 has been brought down into contact with the cut face of a half fruit and has been shifted upwardly by the variation in thickness of the half fruit in the cup the pawl 680 will be vertically adjusted relative to the two ratchets with the staggered teeth, whereby the pawl will move upwardly and thence in synchronized movement the shaft 606 through the cam 710 will operate the roller to rotate the shaft 698, which in turn with its connection with the two depending ratchet members will move the ratchet members inwardly so as to have the shoulders of the ratchet teeth thereon overlie the pawl 680, whereby to prevent any further upward movement of the pawl 680 and thus to hold the pad 648 in its vertically adjusted position.

This pad holding movement may be appropriately timed by the configuration of the cam to occur during any desired period during the peeling operation but it is preferred that the pad be locked after it has been adjustably raised to its desired height in accordance with the thickness of the half fruit in the cup and thereafter automatically to be locked in any such vertically adjusted position.

Upon the completion of the peeling operation the paring knife is shifted to a position out of the fruit cup and at the same time the peeling head is lifted out of engagement with the fruit and is returned to its raised position. During the raising of the fruit peeling head a suction is created on the main fruit pad engaging the wet flat sticky surface of the half fruit. Such suction, however, is broken by the smaller spring-pressed plunger contacting the flesh of the fruit in the pit cavity.

In addition to the function of breaking any vacuum between the cut, sticky face of the half fruit and the main pad 648, the smaller pad 688 functions to contact the flesh of the pit cavity and to press downward on this flesh at the pit cavity so as to force the central portion of the flesh of the pitted half fruit firmly against the central inner wall portion of the fruit cup and thereby prevent this portion of the half fruit from being pushed upwardly toward the pit cavity as the peeling knife arcuately moves through the cup during the peeling operation. In addition, as shown in Figures 11, 18 and 32, as the peeling head moves upwardly away from the cut face of the half fruit the cam mechanisms 474 and 486 contact the rollers 276 and 278 to release the clamping members 308 and 310 from the half fruit whereby to permit the same freely to drop in the cup mechanisms. The curved periphery of each half fruit carrying the peel will be supported by the curved inner walls of each fruit cup and the cut face of each half fruit and the pit cavity thereof will be exposed and will lie in a horizontal plane so that on the next intermittent rotation of the turret, these two fruit cups each carrying a pitted half fruit therein will be presented to the peeling station B as hereinbefore described.

After the peeling has been accomplished the turret again intermittently moves to carry the same two fruit cups, with the peeled and pitted half fruits therein and with the loose peeling underlying the peeled half fruit, to the next station, such as C, at which station automatic means not shown but which may be of the type disclosed and claimed in the application of Raymond L. Ewald and Henry A. Skog, Serial No. 430,840, filed February 14, 1942, now issued as Patent No. 2,388,682 of November 13, 1945, the same being a division of an application, Serial No. 185,332, filed January 17, 1938, now issued as Patent No. 2,280,813 of April 28, 1942.

From the fruit discharge station C the turret subsequently moves intermittently to the scavenging station D where mechanism not herein shown but one construction of which, as disclosed in said application, Serial No. 430,840 is provided for scavenging or discharging the peeled peeling from the cup. Subsequently these two scavenged cups will then be intermittently moved by the turret back to station A where the cycle is repeated and freshly pitted, but not peeled, half fruits will be again disposed into these cups. It is to be understood that these two fruit cups which have been taken through the cycle of operations are but illustrative of what happens to the remaining six fruit cups of the total of eight fruit cups carried by the turret. It is to be noted that in the present application a line centrally through the fruit cups will not lie radially through the turret as in said prior application Serial No. 430,840, and therefore at the peeling, scavenging and discharging stations two peeling devices, two fruit discharging devices and two scavenging devices will be utilized whereby simultaneously to process the two half fruits at these respective stations to correspond with the pitting and discharging of two half fruits into the pair of fruit cups at the station A.

*The modified fruit cutting and half fruit separating structure or assembly of Figs. 39 et seq.*

In Figs. 39 et seq. I have shown modified structures of combined flesh cutting and half fruit separating blades or plates which are preferably but not necessarily used in association or combination with means for producing a relative movement between said assembly and a whole fruit whereby the whole fruit is formed with a diametral kerf or cut substantially at and parallel to its suture plane and substantially through the flesh of the whole fruit substantially up to and substantially around the margin of the pit in a manner such that the plate or blade assembly or structure lies in the kerf so formed with portions of this assembly lying in contact with the cut faces of the so-bisected fruit flesh and with the unsevered pit lying in recessed portions of at least certain portions of the plates or blades so that upon movement being imparted to certain of said plates or blades or the portions thereof contacting the cut faces of the half fruits, in opposed directions away from the held pit, the half fruits will be separated from the pit and will be discharged to any desired station. In the present instance it is preferred that the half fruits be discharged or spread into a pair of opposed half cup sections or fruit holders for further processing operations.

More specifically, in the construction of Figs. 39 et seq. the plate or blade separators 292 and 204 are likewise formed not only with frontal cutting edges but also the pit recesses 293 and 295 formed in the separators so that on opposite outward movement thereof said separators 292 and 294 will not strike the pit, and are provided with flesh cutting edges disposed to cooperate with the flesh cutting edges of the blades or plates 348 and 380. For purposes of exemplification only, this type of bladed or plate structure or assembly is shown in Figs. 39 and 40 similar to Figs. 17 and 18 to cooperate with a whole peach feeding device such as the device 72, 98 of Fig. 5, it being understood of course that in lieu thereof any type of means may be utilized for producing relative movement between different plate-like structure or assembly and a whole fruit positioned by any type of cooperative feeding mechanism or fruit holding mechanism so that relative movement therebetween will cause the peach to be moved relative to and across the plates of the structure shown in Fig. 39 when the same are in substantially a common plane such for instance as shown in cross section in Fig. 41.

In Figs. 42 to 46, inclusive, I have shown the progression of a freestone peach relatively across the blade structure or assembly, it being understood that any type of movement for producing relative feeding between the whole peach and the plate structure may be used, such, for illustration, as the feeding arm 72, 98 of Fig. 6 of the drawing. Obviously other types of means for producing relative feeding movements between the whole peach and the blade structure and the combined cutting and spreading plates may be used. These Figs. 42 to 46 show that peaches even of the same size will vary as to the size of the pits thereof, the various size pits being shown in dotted lines within the peach structures of these figures. The provision of cutting edges on the separator plate portions of the structure in association with the complemental cutting edges of the associated plates or blades, together with the arrangement of at least certain of the blades to shift relatively in the common plane of the blades together with mechanism for shifting certain portions of the associated plates or blades outwardly in opposite directions away from the pit held by the structure whereby to produce a tearing or rending action between the bisected fruit sections and the pit, provides a most effective means for separating the bisected half fruits from the pit and for discharging the half fruits free of the pit to the desired location.

The parts of the mechanism shown in Figs. 39, 40 and 41 are identical with the mechanism shown in Figs. 17, 18 and 19 except for the specific construction of the separated plates or blades 292 and 294. Therefore referring to these blades 292 and 294, taking for instance the blade 292, the blade 294 being identical therewith, such blade 292 is provided with a pair of spaced apart frontal flesh cutting edges 2921 and 2922. The cutting edges 2921 and 2922 are preferably beveled and are formed entirely preferably along the entire front edges of the blade and around the curved portions 2923, 2924. The two portions 2925 and 2926 need not be quite as sharp or form as keen cutting edges as the portions 2921, 2922, 2923 and 2924. These latter portions should be kept very keen. The portions 2927, 2928 up to the end point 2929 are likewise keen, beveled cutting edges. It is noted that the cutting edges of the cooperating blades or plates 348 and 380 are located well ahead of the frontal cutting edges 2921 and 2922.

The reentrant recesses 326 and 328 of the two separator blades or plates register with recessed portions formed in the cooperating cutting plates 348 and 380 as shown in Figs. 17 and 18 and 39 and 40. The recesses 326 and 328 are formed large enough so that these separators may be moved outwardly in opposite directions away from the pit without contacting the pit so that the pit may be held by appropriate mechanism such for instance as shown in Figs. 39, 40 and 41 by the toothed portions 442 and 450 of these recessed cutting edges of the cutter plates or blades 348 and 380.

The frontal cutting edges of the cutter blades cut through the peeling and must be keen and sharp to accomplish this function. The frontal cutting edges of the cutter blades must be sharp to cut the tough peel of the fruit and be pivoted out of the way of the pit when the pit approaches the edge of these blades so that it will not be injured or dulled by contact with the pit. The cutting edges on the half fruit separators are not formed sufficiently keen so that they would be damaged by contact with the pit but are sharpened sufficiently that they will exercise a cutting effect upon the flesh of the fruit after the cutting edges of the other cutting blades have cut through the peeling of the fruit. As the blades pass through the flesh of the fruit and contact the peeling from the inner side of the peach, the peeling may be severed, but due to the fact that the peeling is pushed outwardly from the flesh of the fruit it does not bruise the surface of the peach.

Upon the extreme feeding movement of the peach across the inner recessed portion of the separator blade, inasmuch as this blade approaches the unsevered peeling from the inside flesh portion of the fruit in a direction outwardly thereof, this blade need not be as keen as the frontal cutting edges of the cutter blades in order to cut this skin or peel because in this cutting action the peel would be pushed outwardly away from the flesh and the flesh of the fruit will not be bruised or damaged during this particular cutting action.

The provision of the flesh cutting edges on the half fruit separator plates or blades provides means for cutting portions of the flesh of a whole peach wherein such peaches have particularly large pits. In these instances due to the presence of these large pits the cutting plates or blades 348 and 380 must be timed or adjusted in advance so that they must open sufficiently wide initially to permit the passage of the large pits therebetween without being contacted or injured by these pits, and when this takes place certain areas of the flesh of the peach escape being cut by these frontal and corner edges of the cutter blades 348 and 380. Therefore in order to cut these heretofore uncut portions of the flesh, the spreader plates were provided with complemental flesh cutting edges which took care of these uncut edges and also were arranged to cut portions of the flesh of the peach at and during the innermost movement of the whole peach across the blades when they were disposed in the common plane.

So also due to the presence of the large pits and the necessity of opening the blades 348 and 380 sufficiently wide so as not to contact the pits, it is found that the foremost portion of the whole peach being fed into the machine will not be cut by the frontal cutting edges of the blades 348 and 380, and therefore the spreader or separator blades or plates were provided at their recesses with the cutting portions 2927, 2928 and 2929 to cut these particular portions of the peach. In this particular construction (see Figs. 42 and 43), Fig. 42 shows the two spreader blades 292 and 294 in substantially the same common plane as the cooperative cutting blades 348 and 380. The frontal cutting edges of these two blades must be kept with a keen edge because their cutting edges are entering the peel of the fruit from the outside. If they were dull the edges would press into the fruit, causing bruises by first pressing the skin into the fruit before cutting therethrough.

Fig. 43 shows the frontal cutting edges of the blades 348 and 380 after they have entered the flesh of the peach. Since the pits vary in size and also vary in position within the peach, these blades must be separated in timed relation with the entrance of the peach in such a manner that the pit will not strike against any part of the cutting edges of these blades. In addition, the blades must be pivotally separated in their common plane so that the points 2931, 2933 lie above and below the projections of the edge lines 2918 and 2920, see Fig. 44, of the upper and lower internal edge recesses of the half fruit separators.

These edges marked 2918 and 2920 of Fig. 44 are formed by grinding each to 1/64 of an inch thick and then rounding off from one of the surfaces of the sides whereby to produce a blunter cutting edge to this portion of the spreader blades. This is done to increase the strength of the cutting edge so that if a pit strikes the forward rounded corner of this edge of the separator blades, the edge will not be injured. This construction is permissible because these separator blades do not have to enter the fruit from the outside. The cutting blades 348 and 380 had previously cut a path for the separator blades and so also a blunter cutting edge can emerge from the inside of the flesh of the fruit to cut through the outer peeling without marring the fruit, as heretofore described.

Fig. 45 shows the peach at its innermost position of travel or in a position where when the separator blades or plates pressing against the cut surfaces of the half fruit move the same outwardly in opposite directions to spread the halves apart, the half fruits will be either discharged to a desired point or shifted into the peeling cups. It will be noted that the innermost edges of the reentrant recesses in the separator blades are formed as cutting edges 2927, 2928 and 2929 in the manner shown to cut away any flesh that the cutting blades 348 and 380 have missed during the passing of the peach, as shown from Fig. 44 to position 45.

In Fig. 46 the cutting blades 348 and 380 have closed down onto the pit and the cutting edges 2932 and 2934 have further cut down around the peach into the stem cavity. It will be noted that the stem cavity is placed rearmost as the peach is fed forwardly. This inward movement of the two cutting blades 348 and 380 causes the sawlike teeth to grip the pit securely and after which, in the manner heretofore described in connection with Figs. 17, 18 and 19, the separator plates are moved outwardly in opposite directions about their pivots and the flat plate portions thereof contacting the cut faces of the half fruit push the half fruit outwardly to discharge the same away from the held pit. In the present instance they discharge the half fruits into the fruit cups.

It will thus be seen that the fruit processing apparatus described comprises impaling means including cutting means for forming a diametrical cut into the fruit, and separating means for effecting the separation of the fruit halves relative to each other and to the pit, following the cutting operation.

More specifically, the invention includes a relatively flat plate structure, part of which includes cutting knife edges for forming a diametrical cut into the fruit, said knife edges having associated therewith relatively flat separator plate portions for effecting the fruit separating operation.

And still more specifically, in the embodiments illustrated in Figs. 39-49, the relatively flat plate fruit impaling structure comprises a plurality of pairs of plates, all of said plates having knife edges formed thereon which enter the fruit diametrically, and said plates, or certain ones thereof, being separable relative to each other to effect the fruit separating operation.

There is further provided, in the foregoing apparatus, power means for relatively separating at least one pair of knife edges during the cutting operation, to accommodate the movements of such knife edges generally to the contour of the pit; and there is further provided, in each instance, a pit-receiving recess in the relatively flat plate impaling structure into which the fruit pit moves during the impaling and cutting operation, and with which is associated pit holding means for holding the pit from movement with the fruit halves during the separating operation. In the embodiment of the invention of Figs. 46-49 such pit holding means specifically comprises a fork-like member between the tines of which the pit is positioned so as to be restrained from movement in opposite directions with the fruit halves.

It is thought that the invention and numerous of its attendant advantages will be understood from the foregoing illustrative description and it is obvious that numerous changes may be made in the form, construction and arrangement of the several parts without departing from the spirit or scope of the invention or sacrificing any of its attendant advantages, the form herein described being a preferred embodiment for the purpose of illustrating the invention.

This application is a continuation-in-part of my pending application Serial No. 440,034, filed April 22, 1942, which has become abandoned.

Having thus described the invention what is claimed as new and desired to secure by Letters Patent is:

1. In a device of the class described in combination with a pair of relatively flat blades adapted to be disposed in substantially a common plane and having edge portions for cutting the fleshy parts of a whole fruit and having edge portions for receiving therebetween and for gripping the pit of said whole fruit, a pair of blade-like separators adapted to be juxtaposed on opposite sides of the blades and each having recessed means for receiving the pit of the whole fruit therein and means for operating the blades to cut the whole fruit and to grip the pit thereof and for shifting said last mentioned separators away from said blades whereby to separate the severed halves of fruit from the pit held by the blades.

2. In combination with a pair of blades adapted to lie substanitally in a common plane, means for relatively shifting said blades toward and from each other, each of said blades being provided with a cutting edge and means for holding a whole fruit and for feeding the same with its suture plane parallel to and substantially lying in the plane of operation of the blades whereby to cause said blades to cut through the flesh of the fruit, leaving the pit unsevered and disposed between the blades, means associated with each of said blades for gripping opposed portions of the pit for firmly holding the pit, a pair of spreader means adapted during the feeding movement of the whole fruit to be positioned juxtaposed to the plane surfaces of the blades so as to receive the cut surfaces of the fruit thereon, means actuatable upon the completion of the fruit severing means for shifting said fruit spreader means in opposite directions away from the pit and for discharging each of said fruit sections into a half fruit holder, half fruit holding means, means operably associated with each of said fruit discharging means for holding the fruit thereon during the discharging operation and for releasing the fruit therefrom to discharge each half fruit into said half fruit holding means, mechanism operable in timed relation therewith adapted to pass across opposite sides of the plane of action of the fruit severing blades for discharging an un-dislodged pit from between said blades or for removing a pit which is fallen onto said fruit discharging means.

3. In combination with a pair of blades adapted to operate in a common plane toward and from each other, each of said blades having a cutting edge adapted to cut the fleshy portion of a whole fruit, means for holding the whole fruit and for feeding the same with its suture plane parallel to and lying substantially in the plane of operation of the blades into a position such that the pit of the whole fruit lies between the blades when the same have been opened whereby the cutting edges have severed fleshy portions of the whole fruit, gripping means associated with the blades adapted to grip both surfaces of the pit to hold the same, relatively flat and thin spreader blades normally positioned adjacent the exterior opposed surfaces of the blades during the fruit feeding movement, said spreader blades being arranged to receive the fleshy portions of the fruit thereon while clearing the pit of the fruit, mechanism for holding each fruit section on said exterior surface of a spreader blade, spaced half fruit holding means, means for shifting said spreader blades from fruit receiving position angularly and arcuately to a fruit discharge position whereby to discharge each fruit section into said half fruit holding means, and mechanism associated with and operating in timed relation to the movement of said fruit severing blades and said spreader blades for moving across opposed surfaces of the severing blades for dislodging a pit therefrom and likewise for moving across the faces of the spreader blades when in fruit discharging position to remove debris therefrom.

4. In a machine for treating whole fruit, the combination of spaced fruit holders each having walls shaped to support the curved walls of a half fruit, shiftable fruit holding means having walls shaped to receive and support a whole fruit, means for shifting the whole fruit holding means along a predetermined path toward and from and along a path between the spaced fruit holders, relatively shiftable severing means disposed in said path of movement of the supported whole fruit for cutting through the fleshy portions of the whole fruit substantially around the pit, said severing means at their junction having recessed portions shaped to receive the pit during the flesh severing operation, said severing means being formed so as to provide two fruit halves, and said recessed portions in said relatively shiftable severing means stationarily receiving the pit of the fruit therebetween at the completion of the severing operation, means for holding the pit, and means engaging the cut surfaces of each fruit half for separating each severed fruit section from the held pit, said separating means discharging each such section into a fruit holder.

5. In a machine for treating whole fruit, the combination of a turret having pairs of spaced fruit holders disposed in a common plane, each fruit holder having wall portions shaped to support the curved walls of a half fruit, shiftable fruit holding means including mechanism for moving the holding means along a path toward and from the turret and between each of a pair of fruit holders to move a whole peach supported in the fruit holder along said path with the suture plane of the peach disposed vertically in said path and its longitudinal stem axis disposed horizontally and radially of the turret, relatively shiftable severing blades disposed in said path with the blades disposed vertically and radially of the turret, said blades being relatively shiftable in said vertical plane and formed with frontal and confronting cutting edges, the confronting edges of the blades being formed to provide a recess to receive the pit of the fruit therebetween, and means for relatively actuating said blades to open and close the same in timed relation with the inward movement of the whole peach toward the turret for circumferentially splitting the flesh of the peach up to the marginal outline of the pit and for positioning the pit in the recessed portion of the blades, means for holding the pit in said recessed portion, relatively thin means positioned to enter the circumferential split formed in the flesh of the fruit by the blades, and means for operating said last mentioned means for shifting the severed fruit halves simultaneously outwardly away from the held pit and for depositing each half fruit into one of the half fruit holders of the turret.

6. In a device of the class described, in combination with a pair of fruit severing blades having flesh severing portions, each blade having cutting edges including external frontal cutting edges for cutting the flesh of a whole fruit and also having pit gripping means formed integral with said blades, means for relatively separating said blades, means operable as said blades separate relatively for feeding a whole fruit toward the opening formed by said relatively open blades and relatively to the flesh cutting edges of said blades to cause the cutting edges of said blades to sever the flesh of said whole fruit following closely around the periphery of the pit of the whole fruit and whereby said whole pit is moved with said fruit to a position between said blades, means synchronizing the blade moving means with the whole fruit feeding means so that said blade moving means is operative during the movement of said whole fruit and pit inwardly between said blades for bringing said blades relatively toward each other to cause said cutting edges substantially to follow the major portion of the periphery of said pit and to cause the pit gripping means of said blades to grip said pit therebetween, and shiftable means disposed in the plane of severance of the fleshy portions of said whole fruit and adapted to contact the cut faces of the half fruit and move the same outwardly in opposite directions away from said held pit to remove the severed fruit sections from the pit.

7. In a fruit processing machine, the combination of a turret carrying a plurality of pairs of spaced fruit holders each designed to receive and support the curved surface of a half fruit section, power operated means for rotating the turret to present a pair of such fruit holders on opposite sides of a predetermined station relative to the path of movement of the fruit holders when moved by the turret, means for supporting a whole fruit, means operated in timed relation to the operation of the turret actuating means for moving the whole fruit supporting means toward the turret and in a plane intersecting the predetermined station and the axis of rotation of the turret and parallel to said axis of rotation, means shiftable relatively to the turret and to the fruit holders when so positioned on opposite sides of and adjacent said predetermined station for cutting diametrically through the flesh only of the whole fruit when fed toward the turret leaving the pit unsevered and dividing the flesh of the fruit into two fruit sections, means to grip and hold the pit, a pair of spreaders mounted at said halving station and in the path of movement of the whole fruit and arranged to enter the circumferential cut made by the fruit halving means, means for shifting said spreaders substantially 90° from said position to deposit each half fruit in one of the pair of empty half fruit holders free of the pit, means for discharging the pit, said turret moving means thereafter shifting said spaced fruit holders each so supporting a pitted half fruit to a second station, means at said second station for simultaneously peeling the two so supported and pitted half fruits, said turret moving means then shifting the so supported pitted and peeled half fruits in said fruit holders to a third station, means at said third station for simultaneously discharging the two half fruits from their spaced holders while leaving the peelings in said holders, said turret moving means then moving said pair of spaced fruit holders containing the peelings to a fourth station and means at said fourth station for simultaneously scavenging the peelings from said pair of fruit holders.

8. In a device for processing fruit, the combination of a turret carrying a plurality of spaced apart pairs of fruit holders, each designed to support a half fruit by its curved surfaces with the cut faces of the half fruit exposed, means located at a predetermined peach halving and pitting station disposed relatively close to the path of movement of the fruit holders when moved by the turret for severing diametrically through the flesh of the whole fruit and for gripping the pit thereof at said station whereby to provide two substantially half fruit sections, means at said station for separating the half fruit sections from the pit and for simultaneously discharging each pitted half fruit section into one of said fruit holders whereby each half fruit has its curved outer face in contact with and is supported by the walls of a fruit holder, means for moving the turret to shift the two fruit holders carrying the pair of half fruits to a peeling station, peeling means disposed at said station and actuated in association with the fruit holders holding the pitted half fruits simultaneously to peel the pair of half fruits and means cooperating with the peeling means for engaging the cut faces of each of the half fruits while in the fruit holders for holding the same from tilting in the fruit holders during the peeling operation, said last named means including means adapted simultaneously to engage the flesh of each half fruit in the pit cavity to press the same toward the curved inner wall of the fruit holder during at least a portion of the peeling operation.

9. In a fruit processing device the combination of a pair of relatively shiftable, relatively thin members having frontal cutting edges disposed substantially in the plane of said members, each of said members at their juncture and to the rear of said cutting edges being recessed to receive the pit of a whole fruit therebetween, means for shifting said members relatively away from and then toward one another while at the same time a whole peach with its suture plane parallel to and substantially coinciding with the plane of said members is moved toward and across the frontal severing edges of said members whereby to cause said members to form a circumferential cut substantially around and through the flesh of the whole peach substantially following the peripheral walls of the pit and whereby to cause the unsevered pit to lie in the recess between said severing members, the internal walls of said recess being provided with means for gripping the peripheral walls of the pit to hold the same therebetween, and a pair of relatively thin shiftable members associated with said severing means and means for shifting said members to a first position parallel to and adjacent the outer faces of said severing means whereby said shiftable means enters and lies in the circumferential cut formed by said severing means, said means shifting said second mentioned members to a remote position away from said severing means whereby to separate the severed halves from the held pit.

10. In a device of the class described, in combination with spaced fruit holders, whole fruit severing means disposed remotely from and between said holders to halve the flesh of a whole fruit when moved across said severing means, a pair of shiftable spreaders, means for moving the spreaders back and forth from a position adjacent the severing means at which position the outside face of each spreader receives a severed half fruit thereon to a remote position across the mouth of a fruit holder to deposit a half fruit therein, scavenging means, and means for moving the scavenging means across the face of each spreader as the spreader lies across the fruit holder and for thereafter moving each scavenging means away from the spreaders prior to the movement of the spreader back to position adjacent the severing means.

11. In a device of the class described, in combination, spaced half fruit holders disposed with their mouths in a horizontal plane, whole fruit severing means disposed in a vertical plane between said holders, spreaders pivotally mounted above said fruit holders, and means for passing a whole fruit across the severing means to halve the flesh of the fruit and position a severed half fruit on the outer face of each spreader, means for simultaneously and oppositely moving the spreaders each to overlie a fruit holder and to deposit a half fruit in each fruit holder, scavenging means for each spreader, and mechanism for operating the latter to move the scavenging means across the face of each spreader as it overlies the fruit holder.

12. In a device of the class described, in combination, spaced half fruit holders disposed with their mouths in a horizontal plane, whole fruit severing means disposed in a vertical plane between said holders, spreaders pivotally mounted above said fruit holders, and means for passing a whole fruit across the severing means to halve the flesh of the fruit and position a severed half fruit on the outer face of each spreader, means for simultaneously and oppositely moving the spreaders each to overlie a fruit holder and to deposit a half fruit in each fruit holder, scavenging means for each spreader, and mechanism for operating the scavenging means to move the scavenging means across the face of each spreader as it overlies the fruit holder, and means for thereafter retracting each scavenging means and for subsequently returning each spreader to its position adjacent its flesh severing means.

13. Means for circumferentially slicing the flesh of a whole fruit along its suture plane comprising a pair of relatively thin elongated blades disposed substantially in a common plane, said blades being mounted for opening and closing movement substantially in said plane, said blades having confronting edges extending longitudinally thereof, a relatively short forward portion of said confronting edges being formed as relatively short cutting edges, the confronting edges of said blades to the rear of said relatively short cutting edges forming an elongated recess therebetween, the edges of said recess being toothed, the frontal portions of said blades being formed as cutting edges and being arranged in the form of a relatively shallow V when said blades are in closed position, means for relatively opening and closing said blades, and a pair of spreader plates pivotally mounted on each side of said blades, said spreader plates being relatively thin and extending longitudinally of the blades and terminating substantially at the front part of said recessed portion of the blades, each of said spreader plates having a substantially centrally located open-ended cutout registering with the recess formed between said blades when the latter are in closed position and being wider than said recess, with the rear end of said cutout portion of said spreader plates substantially terminating rearwardly of said recess, the front part of the cutout being open at the front of the spreader plates, and means for angularly shifting the spreader plates from a position in which they lie parallel to and adjacent the outside walls of said severing blades, to a position wherein they lie remote from and angularly to said severing blades.

14. Means for circumferentially slicing the flesh of a whole fruit along its suture plane comprising a pair of relatively thin elongated blades disposed substantially in a common plane, said blades being mounted for opening and closing substantially in said plane, said blades having confronting edges extending longitudinally thereof, a relatively short forward portion of said confronting edges being formed as relatively short cutting edges which are slightly angularly disposed with respect to the longitudinal axes of said blades, the confronting edges of said blades to the rear of said relatively short cutting edges forming an elongated recess therebetween, the edges of said recess being toothed, the frontal portions of said blades being formed as cutting edges and being arranged in the form of a relatively shallow V when said blades are in closed position, means for relatively opening and closing said blades, and a pair of spreader plates pivotally mounted on each side of said blades, said spreader plates being relatively thin and extending forwardly of the blades and terminating substantially at the front part of said recessed portion of the blades, each of said spreader plates having an open-ended cutout registering with the recess formed between said blades when the latter are in closed position and being wider than said recess, with the rear end of said cutout portion of said spreader plates substantially terminating rearwardly of said recess, the front part of the cutout being open at the front of the spreader plates, and means for pivotally shifting the spreader plates from a position in which they lie parallel to and adjacent the outside walls of said severing blades, to a position wherein they lie angularly to said severing blades, and half fruit clamping means mounted on each of said spreader plates, there being means for operating said clamping means to hold a half peach against said plate when the spreader plate is in substantially parallel relation with said blades and for releasing said clamping means when the plates are in the last mentioned angular position.

15. Means for circumferentially slicing the flesh of a whole fruit along its suture plane comprising a pair of relatively thin elongated blades disposed substantially in a common plane, said blades being articulated at their rear ends for pivotal movement, said blades having confronting edges extending longitudinally thereof, a relatively short forward portion of said confronting edges being formed as relatively short cutting edges, the confronting edges of said blades to the rear of said relatively short cutting edges forming an elongated recess therebetween, the edges of said recess being toothed, the frontal portions of said blades being formed as cutting edges and being arranged in the form of a relatively shallow V when said blades are in closed position, means for relatively opening and closing said blades, and a pair of spreader plates pivotally mounted on each side of said blades, said spreader plates being relatively thin and extending longitudinally of the blades and terminating substantially at the front part of said recessed portion of the blades, each of said spreader plates having a substantially centrally located open-ended cutout registering with the recess formed between said blades when the latter are in closed position and being wider than said recess, with the rear end of said cutout portion of said spreader plates substantially terminating rearwardly of said recess, the front part of the cutout being open at the front of the spreader plates, and means for pivotally shifting the spreader plates from a position in which they lie parallel to and adjacent the outside walls of said severing blades, to a position wherein they lie substantially at right angles to said severing blades, and clamping means mounted on the outer wall of each of said plates, there being means for operating said clamping means to hold a peach against said plates when the spreader plates are in substantially parallel relation with said blades and for releasing said clamping means when the plates are in position substantially 90° from the first mentioned position, said clamping plates being relatively elongated and being pivotally mounted at the upper rear edges of said spreader plates, said plates having an actuating means therefor.

16. In a machine for treating whole peaches and the like, the combination of a pair of spaced fruit holders each having walls shaped to support a curved wall of a half fruit, shiftable fruit holding mechanism having means to receive and support a whole fruit, means for shifting the whole fruit holding means along a path substantially midway between the fruit holders, relatively separable flesh severing means disposed substantially in the path of movement of the supported whole fruit, said flesh severing means having cutting edges including confronting portions formed to provide a pit pocket therebetween, means for operating said flesh severing means in timed relation with the movement of the peach moving means for severing substantially diametrically through the fleshy portions of the whole fruit substantially along the suture plane of the whole fruit to form half fruit sections, said means causing the unsevered pit of the whole fruit to pass between said severing means and to lie within said pit pocket between said severing means, and means acting on the severed fruit sections as the pit therebetween lies in said pit pocket for moving the severed half fruits away from the severing means and for discharging each such section into a half fruit holder.

17. In a machine for treating whole peaches and the like, the combination of a pair of spaced fruit holders each having walls shaped to support a curved wall of a half fruit, shiftable fruit holding mechanism adapted to receive and support a whole fruit, means for shifting the whole fruit holding mechanism along a path substantially midway between the fruit holders, relatively separable flesh severing means disposed substantially in the path of movement of the supported whole fruit, said flesh severing means having cutting edges including confronting portions formed to provide a pit pocket therebetween, means for operating said flesh severing means in timed relation with the movement of the peach moving means for severing substantially diametrically through the flesh portions of the whole fruit substantially along the suture plane of the whole fruit to form half fruit sections, said fruit holding mechanism causing the unsevered pit of the whole fruit to pass between said severing means and to lie within said pit pocket between said severing means, and means acting on the severed fruit sections as the pit therebetween lies in said pit pocket for moving the severed half fruits away from the severing means and for discharging each such section into a half fruit holder, and means cooperating with the movement of the half fruit separating and depositing means for gripping the pit section in the pit pocket to assist in the separation of the pit from either of the half fruit sections to which it tends to adhere upon movement of the fruit separating and depositing means.

18. In a fruit processing machine, the combination of spaced fruit holders each constructed to receive and hold a severed fruit section, shiftable fruit spreading means shiftably mounted for movement from a first position to receive the severed fruit sections thereon and to another position to discharge a severed fruit section into each holder, relatively separable fruit severing means projecting forwardly of the fruit spreading means when in fruit receiving position and operative to cut substantially diametrically through the flesh only of a whole fruit and substantially around the pit when the whole fruit is moved into contact with and across said fruit severing means in a manner to leave the pit unsevered, means for positioning the unsevered pit stationarily between said severing means during the flesh severing opholding means and wiping mechanism associated with and operating in timed relation to the movement of said fruit severing blades and said spreader blades for wiping across opposed surfaces of the cutting blades for dislodging a pit therefrom and likewise for wiping across the faces of the spreader blades when in fruit discharging position to remove debris therefrom, and means for removing the pit and debris discharging mechanism from the zone of action of the spreader blades and for thereafter moving the spreader blades to fruit receiving position adjacent the cutting blades.

26. In a fruit processing machine, the combination of a turret carrying a plurality of pairs of spaced half fruit holders each designed to receive and support the curved surface of a half fruit section, power operated means for rotating the turret to present a pair of such fruit holders on opposite sides of a predetermined plane disposed radially of the turret, means for supporting a whole fruit, means operated in timed relation to the operation of the turret actuating means for moving the whole fruit supporting means toward the turret and along a path lying in said predetermined plane, separable cutting means positioned substantially in said plane and conjointly formed to provide a pit receiving recess therebetween and shiftable relatively to the fruit holders when positioned on opposite sides of and adjacent said predetermined plane for cutting diametrically through the flesh only of the whole fruit when fed radially across the cutting means and toward the turret for dividing the flesh only of the whole fruit into two fruit sections leaving the pit unsevered in the pit recess between the flesh cutting means, and power operated, relatively thin means actuatable in timed relation to the cutting means and positionable into the circumferentially formed cut and shiftable laterally in opposite directions normally to the plane of the cut for discharging each of the fruit sections free of the pit into one of the spaced fruit holders so that such sections are each supported at their curved surfaces in one of said fruit holders.

27. In a fruit processing machine, a pair of spaced fruit holders each having walls for supporting a half fruit with its cut face exposed, means for halving the flesh of the whole fruit leaving the pit unsevered and stationarily in situ between the severed halves and between the severing means, means for stationarily holding the unsevered pit in such position, half fruit separating and transfer means adapted in one position to be disposed in the severance, said transfer means being apertured to register with the pit, and means for shifting the transfer means away from the pit for transferring the fruit halves into the fruit holders leaving the whole pit in the pit holding means.

28. In a fruit processing machine the combination of spaced horizontally disposed fruit holders each constructed to receive and hold a severed fruit half, shiftable fruit spreading means having elongated open-ended slots disposed substantially centrally thereof and adapted in one position to receive the severed fruit halves thereon and in another position to be associated with the spaced fruit holders to discharge a severed fruit half in each holder, relatively separable fruit severing means adapted to be positioned adjacent to the fruit spreading means in said fruit receiving position of said spreaders, said fruit severing means substantially diametrically severing through the flesh of a whole fruit, leaving the pit unsevered and being relatively shiftable and having recessed confronting edges to receive and stationarily position the unsevered pit therebetween, said pit receiving recess registering with the elongated open-ended slots in said fruit spreading means, means for mounting said fruit spreading means and said whole fruit severing means adjacently to the fruit receiving position of the spreading means so that as said flesh of the whole fruit is cut substantially diametrically, the severed half sections of fruit are positioned on said fruit spreading means, means for holding the unsevered pit stationarily between the severing means, and means for shifting the fruit spreaders to discharge a severed fruit section independently of the whole pit into each fruit holder.

29. In a whole fruit processing machine, the combination of at least two substantially coplanar pit holding means adapted to shift relatively to receive and grip therebetween the pit of a whole fruit, means forming a rigid part of and movable with said pit holding means for substantially circumferentially severing the flesh of the whole fruit about the pit for dividing the fruit, but not the pit, into half sections, and a pair of means disposed in the circumferential cut one on each side of the coplanar pit holding means, said pair of means when so disposed lying substantially parallel with said coplanar pit holding means, and mechanism to operate said pair of means away from said coplanar means to shift the severed fruit sections away from the held pit.

30. In a fruit processing machine, the combination of a pair of spaced fruit holders each having internally formed walls to contact and hold a half fruit by means of its curved outer walls with its cut face uppermost, relatively separable flesh severing means having portions shiftable in a predetermined common plane and disposed between the fruit holders, means for feeding a whole peach with the suture plane positioned parallel to and movable along said predetermined plane and across said flesh severing means to cut the flesh only of the fruit into fruit halves, means for retaining the whole pit stationarily positioned between the flesh severing means, and shiftable means operable on the severed faces of the fruit sections for shifting the fruit sections bodily laterally of said plane away from the held whole pit and for simultaneously transferring each of said halves into one of said remotely located fruit holding means.

31. In a fruit processing apparatus, the combination of a pair of spaced fruit holders, a pair of relatively separable fruit severing blades disposed above and between and remotely from said fruit holders, each blade having an exteriorly located frontal cutting edge, means to shift said blades from more or less closed position to open position as a whole fruit is passed from a location in front of said blades across said frontal cutting edges for circumferentially severing a portion of the flesh of the whole fruit and as said blades open for allowing the pit of the fruit to pass into stationary position between said blades, said blades having interiorly disposed pit holding means formed thereon, said blade shifting mechanism being operative thereafter to cause said blades to move relatively toward each other to grip and hold the unsevered pit therebetween, and bodily shiftable means engaging the cut surfaces of the severed fruit eration, means for stationarily holding the pit so positioned between said severing means, and mechanism for shifting said spreading means away from the held pit to discharge a severed fruit section into each of said fruit holders.

19. In a fruit splitter and pitter, a pair of fruit splitting blades having spaced flesh severing edges lying in a single common plane and which plane is disposed within the planes of the sides of the blades, and said blades also having portions adapted to be spaced apart to engage opposite sides of the fruit pit when the blades have severed portions of the flesh of the whole fruit, said portions of each blade having alternately oppositely bevelled saw-like teeth lying wholly within the planes of the sides of each blade and adapted to straddle any sharp rim of the pit at said portions.

20. In a machine for treating whole fruit, the combination of a turret having spaced fruit holders each having walls shaped to support the curved wall of a half fruit, power means for turning the turret, shiftable fruit holding means having means to receive and support a whole fruit, means operating in timed relation with the operation of the turret for shifting the whole fruit holding means toward and from the turret, power operated, relatively separable means disposed in the path of movement of the supported whole fruit including means for operating said relatively separable means as the whole fruit is shifted toward the turret for severing substantially diametrically through the fleshy portions only of the whole fruit to form half fruit sections while leaving the whole pit unsevered therebetween, means for holding the whole pit positioned stationarily between said separable severing means, and means acting on the severed fruit sections for discharging each such section away from the pit and into a half fruit holder.

21. In a fruit splitter and pitter, a pair of fruit splitting blades disposed in a single common plane and having confronting flesh cutting edges, each blade having adjacent its flesh cutting edge a pit gripping portion, the edges of said pit gripping portion being formed with integral relatively smaller portions offset slightly in opposite directions from each other but lying wholly within the lateral side walls of each blade, said smaller offset portions being adapted to engage opposite sides of the fruit pit when said blades are moved toward each other in the splitting and pitting operation, and whereby said oppositely extending offset portions lie on opposite sides of the suture rim of the pit whereby more firmly to grip said pit.

22. In a fruit splitter and pitter, a pair of fruit splitting blades, each having portions adapted to cut through the fleshy portions of a whole fruit and each having portions shaped to receive the whole pit between said blades during the flesh cutting operation, said last named portions having additional means adapted to grip the pit therebetween and means shiftable relatively to said blades and adapted to be disposed parallel to and lying substantially flat adjacent the opposed sides of said blades in the severance formed by said blades for contacting the severed fleshy surfaces of the fruit and means for shifting said severed flesh contacting means outwardly in opposite directions away from the pit whereby to shift the half sections outwardly and separate said severed fruit sections from the pit.

23. In a device of the class described, the combination of a pair of substantially coplanar, relatively separable blades, each blade having confronting cutting edges including transversely disposed frontal cutting edges for severing the fleshy portion of a whole fruit and each blade having a pit gripping portion associated with the flesh cutting edges thereof, power operated means for feeding a whole peach toward and substantially along the line of meeting of the cutting edges of said blades in combination with means operable in timed relation with said peach feeding means for relatively moving said blades apart and thence causing said blades to move relatively toward each other simultaneously with the operation of the feeding means, whereby said cutting edges serve to sever the fleshy portions of the fruit closely following the margin of the pit without cutting the pit and in a manner to receive the unsevered pit between the blades whereby during the approaching movement of said blades said pit is gripped therebetween with the fleshy portions of the fruit substantially completely severed, and means acting in timed relation with the gripping of said pit between the blades and the severance of said fleshy portions of the fruit for contacting the severed fleshy portions of the half fruit and for shifting said fruit halves away from the pit while so held.

24. In a device of the class described in combination with a plurality of relatively flat, thin, relatively shiftable cutting means positioned substantially in a common plane and having cutting edges for severing the fleshy portions of a whole fruit, said cutting means having pit gripping means located to grip opposed portions of the pit when positioned between said cutting means, separating means adapted to be positioned parallel to and in juxtaposition to the opposite faces of the cutting means, means for operating said cutting means to separate the same relatively and then to bring them together relatively and means for feeding a whole peach in synchronism with the means for causing relative opening and closing movements of the cutting means across the cutting means into position such that the pit lies stationarily unsevered between the cutting means and is gripped by the gripping means and means for operating the separating means when positioned parallel to and juxtaposed to said cutting means to shift the severed fruit sections away from the held pit.

25. In combination with a pair of blades adapted to operate in a common plane toward and from each other, each of said blades having a cutting edge adapted to cut the fleshy portion of a whole fruit, means for holding the whole fruit and for feeding the same with its suture plane parallel to and lying in the plane of operation of the blades into a position such that the pit of the whole fruit lies between the blades when the same have been opened, wherein the cutting edges have severed the fleshy portions of the whole fruit, gripping means associated with the blades adapted to grip both surfaces of the pit to hold the same, relatively flat and thin spreader blades normally positioned adjacent the exterior opposed surfaces of the blades during the fruit feeding movement, said spreader blades being arranged to receive the fleshy portions of the fruit thereon while clearing the pit of the fruit, spaced half fruit holding means, mechanism for clamping each fruit section on the opposite surface of a spreader blade, means for shifting said spreader blades from fruit receiving position angularly and arcuately to a fruit discharge position whereby to discharge each fruit section into said half fruit and movable generally normally with respect to the planes of said cut surfaces for shifting the fruit halves to transfer said halves from said severing means and to position the same directly in said remotely located spaced fruit holders.

32. In a machine for treating whole fruit, the combination of spaced fruit holders to support the curved walls of a half fruit, shiftable whole fruit holding means having walls shaped to receive and support a whole fruit, means for shifting the whole fruit holding means to shift the whole fruit thereon so that the suture plane of the fruit moves along a plane adjacent and parallel to a plane between the fruit holders, a pair of relatively separable flesh severing blades movable in said plane and having movable therewith whole pit gripping means, said blades being disposed in said path of movement of the whole fruit for halving the flesh only of the whole fruit leaving the whole pit unsevered, shiftable means for removing the severed halves from the severing blades, and means for operating said shiftable means transferring each pitted half into a fruit holder free of the whole pit.

33. In a fruit processing machine, relatively separable, substantially coplanar flesh halving means for halving the flesh of a whole peach, leaving the pit unsevered and located in situ between the severed halves and between the severing means, means for actuating the halving means, means for holding the pit between the severed halves and between the severing means, shiftable spreader means movable relatively to the halving means and disposed in one position substantially parallel to said coplanar halving means in the severance formed in said peach, means for moving said spreader means away from said halving means to separate the peach halves from the held pit.

34. In a machine for processing peaches and the like, the combination of spaced half peach holders, means for moving a whole peach with its suture plane parallel to and substantially coinciding with a plane bisecting the distance between said holders, relatively separable, substantially coplanar flesh severing blades disposed in said plane for severing the flesh of the peach in said suture plane, leaving the fit unsevered and stationarily disposed between said severing blades, a pair of relatively thin spreaders movably mounted and positionable so as to lie adjacent and parallel to and overlap the major portion of said flesh severing blades on opposite sides thereof, each of said spreaders in such position being disposed to receive a severed half fruit on its exterior surface, each spreader having an opening of greater cross section than and registering with the stationary pit disposed between said blades, means for holding the pit stationary between said blades, means for moving said spreaders to shift the fruit halves away from the held pit and into the peach holders, mechanically actuated means on each spreader for holding the half peaches thereon during the movement of the fruit halves away from the held pit, the openings in the spreaders permitting the fruit halves to move away from the held pit, and means for releasing the peach holding means as the spreaders are positioned adjacent the peach holders.

35. In a peach pitting machine, relatively separable, substantially coplanar means for substantially diametrically severing the peach substantially through its suture plane, means for positioning the pit stationarily therebetween, a pair of spaced fruit holders positionable on opposite sides of said severing means, a pair of half fruit spreaders disposed in lateral parallel registration with and overlapping the severing means, means for substantially aligning the spreaders with the severing means, means for conveying a whole peach across the severing means with the severed halves stationarily positioned onto the aligned spreaders and so that the spreaders are interposed between the severed halves of the peach, means for stationarily positioning the unsevered pit between the severing means, means for angularly and relatively shifting the spreaders apart to deposit one of said halves into each of said fruit holders, each of said spreaders having an opening registering with the unsevered pit to permit the movement of the spreaders without movement of the pit.

36. In a fruit processing machine, the combination of relatively shiftable, relatively thin fruit severing means lying substantially in a common plane and having frontal severing edges disposed substantially in the plane of the fruit severing means, means for relatively shifting said severing means during the time that a whole fruit is moved against and across said frontal severing edges with the suture plane of the whole fruit disposed parallel to and substantially coinciding with the plane of said severing means to cause marginal cutting portions of said relatively shiftable severing means to cut through the flesh of the whole fruit substantially circumferentially about the whole pit thereof and to position the pit and cause it to rest between said relatively shiftable severing means, means disposed in the path of movement of the pit of the whole fruit when so moved with respect to said relatively shiftable severing means for gripping the pit thus positioned therebetween, fruit spreading means comprising relatively shiftable, relatively thin members, means for mounting said members relatively to said severing means so that in one shifted position said members lie parallel and adjacent to the outer faces of the severing means whereby during the whole fruit flesh severing operation said spreading means will enter and lie in the circumferential cut so made by said severing means with the cut half peach sections disposed substantially wholly within the marginal edges of said spreading means, said spreading means having portions thereof spaced from the circumferential edges of the held pit, and means for shifting said spreading means to a position remote from the said severing means whereby to separate the severed half sections of the fruit from the held pit.

37. In a fruit processing machine, the combination of relatively separable, relatively thin and substantially coplanar fruit severing means having frontal and confronting separable severing edges disposed substantially in the plane of the fruit severing means so that when a whole fruit with its suture plane parallel to and substantially coinciding with the plane of said severing means is moved across said severing edges, the flesh of said whole fruit will be severed circumferentially about the pit of the whole fruit and substantially along the suture plane of the whole fruit, said confronting separable severing edges having wall portions formed stationarily to receive the unsevered pit of the whole fruit therebetween during and at the completion of the severing of the flesh of the whole fruit, and relatively shiftable fruit spreading means comprising relatively thin members shiftable in one position adjacent and parallel to the substantially coplanar fruit severing means in position to pass into the cut formed in the flesh of the whole peach during the flesh severing operation of the whole fruit and so that the outer faces of the fruit spreading means may contact the cut faces of the half fruit, said fruit spreading means being of sufficient area so that when disposed in the cut formed in the whole peach, substantially the entire cross sectional area of the whole peach is disposed within the marginal confines of said spreader means, said fruit spreading means in said one position having walls spaced from the whole pit of the fruit disposed between the fruit severing means, and means for shifting the fruit spreading means to a position remote from the fruit severing means whereby to separate the severed halves of the whole fruit from the pit.

38. In a fruit processing device, the combination of a pair of relatively separable, relatively thin members disposed substantially in a common plane, having fruit flesh cutting edges disposed substantially in the plane of said members, each of said members at their juncture being recessed to receive the pit of a whole fruit therebetween, means for shifting said members relatively away from and then relatively toward one another with respect to a whole peach fed forwardly toward said members with its suture plane parallel to and substantially coinciding with the plane of said members to cause said severing members to form a substantially circumferential cut substantially around and through the flesh of the whole peach substantially following the peripheral walls of the pit, and means to hold the pit while in said recess formed by said members to cause the unsevered pit to lie stationarily in the recess between said severing members, and a pair of relatively thin shiftable fruit separating members associated with said relatively thin severing means, and means operating in timed relation to the movement of said severing members for shifting said fruit separating members to a first position parallel to and adjacent the outer faces of said severing means and with the facial walls of said members substantially coextensive with the opposed facial areas of said coplanar relatively thin members whereby said shiftable fruit separating members enter and lie in the circumferential cut formed by said substantially coplanar flesh severing members, said means shifting said fruit separating members to a remote position away from said flesh severing members whereby to separate the severed halves of said peach from each other.

39. In a machine for treating whole fruit, the combination of a turret having pairs of spaced fruit holders for receiving fruit halves with their cut faces outermost, power means for rotating the turret, a shiftable fruit holder shaped to receive and support a whole fruit with its suture plane disposed in a predetermined plane between said spaced fruit holders and radially of the turret, means operable in timed relation with the turret turning means for shifting the whole fruit holding means to position the whole fruit between the fruit holders of the turret and with the suture plane of the whole fruit disposed substantially in said predetermined plane, separable flesh severing blades disposed in the path of movement of the whole fruit while carried in said shiftable whole fruit holding means, said blades having between their front and rear portions opposed edges forming a pit retaining pocket operable as the peach is fed across the flesh cutting edges and as the blades are opening, stationarily to position the unsevered pit of the whole fruit at a predetermined location in said pit retaining pocket between said blades, half fruit spreader means disposed in one position in overlapping relation to the major portion of said blades on opposite sides of the flesh severing blades to enter into the circumferential cut formed in the flesh of the whole fruit by said flesh severing blades, and means for moving said spreaders away from said blades to deposit the fruit halves in the fruit holders on the turret leaving the whole pit in the pocket of said flesh severing blades.

40. In a device of the class described, in combination with a pair of spaced half fruit holders, a pair of spreaders disposed between said fruit holders, means for positioning a severed half fruit on the outside faces of each spreader, means for moving the spreaders from a position in which the spreaders are relatively parallel and adjacent each other and in which position each spreader receives a half fruit on its outer face, to a remote position where each spreader overlies the mouth of a fruit holder to deposit a half fruit in such holder, scavenging means for each spreader, and means for moving the scavenging means across each spreader while the spreader is positioned across the mouth of each holder, and means for moving each scavenging means away from each spreader sufficiently to allow the spreaders to move back to a position where they are adjacent and parallel.

41. In a device of the class described, a pair of spaced half fruit holders disposed with their mouths in a common horizontal plane, a pair of relatively thin, vertically disposed flesh severing blades disposed substantially in a common plane, means for mounting the same for relatively shiftable movement in said plane, said blades being disposed between said holders, a pair of relatively thin spreader blades pivotally mounted and having pivotal axes disposed on opposite sides of the plane of the severing blades and above the horizontal plane of the mouths of the fruit holders, means for moving the spreader blades from a position wherein each blade lies adjacent and parallel to the vertical severing blades to a position wherein each spreader overlies the mouth of a fruit cup, means for moving a whole peach with its suture plane substantially coinciding with the plane of the severing blades, across the severing blades, means for simultaneously shifting said severing blades to open and then to closed position whereby to cause the blades to cut circumferentially through the flesh of a peach and permit the pit of the peach to pass between the blades, said spreader blades being positioned adjacent the severing blades so as to enter and lie in the circumferential cut thus formed, said spreader blades having open-ended recesses therein to permit the pit to lie between said blades and centrally of said spreaders, means for holding the pit while thus positioned between said blades, means for shifting said spreaders from said last mentioned position to the position overlying the fruit cups whereby to deposit a severed half fruit into a cup, scavenging means for each spreader blade, means for mounting said scavenging means, and means for moving said scavenging means when the spreaders are in position overlying each fruit cup for moving the scavenging means across each spreader blade to clean the same, and means for thereafter raising each scavenging means above the zone of movement of the spreader blade prior to the movement of the spreader blades back to vertical position.

42. In a device of the class described, a pair of spaced half fruit holders disposed with their mouths in a common horizontal plane, a pair of relatively thin, vertically disposed flesh severing blades, means for relatively moving the blades to open and closed position, said blades being disposed between said holders, a pair of relatively thin spreader blades pivotally mounted and having pivotal axes disposed on opposite sides of the plane of the severing blades and above the horizontal plane of the mouths of the fruit holders, means for moving the spreader blades from a position wherein each blade lies adjacent and parallel to the vertical severing blades to a position wherein each spreader overlies the mouth of a fruit cup, means for moving a whole peach with its suture plane substantially coinciding with the plane of the severing blades, across the severing blades, means operative at the same time for shifting said severing blades to open and then to closed position whereby to cause the blades to cut circumferentially through the flesh of a peach and permit the pit of the peach to pass between the blades, said spreader blades being positioned adjacent the severing blades so as to enter and lie in the circumferential cut thus formed, said spreader blades having open-ended recesses therein to permit the pit to lie between said blades and centrally of said spreaders, means for gripping the pit while thus positioned between said blades, means for shifting said spreaders from said last mentioned position to the position overlying the fruit cups whereby to deposit a severed half fruit into a cup, an oscillatable shaft disposed above said blades, a sector oscillated by said shaft, a depending rack raised and lowered by said sector, said rack on its lower end carrying a yoke having spaced apart legs straddling the vertically disposed severing blades, and a wiper mounted on each leg of said yoke to overlie the lowered position of each spreader blade, and means for operating said shaft to raise and lower said rack to position the wiper adjacent the lowered spreader blade or to raise the wiper above the severing blades, and means for imparting an oscillation to said rack in the lowered position of said rack for causing said wiper to wipe the upper surface of said spreader blades in their lowered position.

43. In combination with means for feeding a whole peach along a predetermined path, peach flesh severing and half peach discharge means comprising relatively movable, plates adapted in one position to be disposed in a substantially common plane, said plates being formed with spaced frontal flesh cutting edges and integral means forming an adjoining reentrant recess to receive the pit of the peach therein as a result of a flesh cutting action by said edges, said plates providing opposed flat surfaces engageable with the cut faces of the severed peach sections, mechanism providing relative movement between said whole peach feeding means and said flesh severing and half peach discharge plates to cause said flesh cutting edges of said flesh severing and discharge plates to cut kerfs in the flesh of the peach on opposite sides of said pit and for causing the pit to enter said reentrant recess of said means, and means for actuating said flesh severing and discharge plates to cause the said opposed flat surfaces of said members to engage the cut faces of the severed half peach and to move outwardly in opposite directions to discharge said severed half peach sections.

44. A fruit pitting apparatus for whole peaches comprising a plurality of plates or blades each having flesh cutting edges for cutting a whole peach, power means for shifting certain of the plates or blades to form cuts into the flesh of the peach, said blades having complementary recesses therein to receive the pit in uncut condition between said certain of the plates or blades, a pit engaging member separate from said blades and projecting into said recesses, means for holding the pit while so positioned, and power means operable to shift certain of said plates or blades in opposite directions away from the so held pit and while said plates or blades are in contact with the severed fleshy sections of said peach to shift said peach sections away from the held pit and to discharge them free of the pit.

45. A fruit pitting apparatus for whole peaches comprising a plurality of plates adapted in one position to lie substantially in a common plane, each of said plates having frontal peach flesh cutting edges, means for mounting certain of said plates for movement toward and from each other in a single plane as the cutting edges of said plates cut into the flesh of the peach whereby to pass about and receive the uncut pit therebetween, means for holding the uncut pit in position between said plates, and power means operable to shift certain of said plates in opposite directions away from the held pit and while said last mentioned plates are in contact with severed fleshly sections of the peach whereby to separate said sections from each other and from the pit and for discharging said separated sections free of the pit.

46. A fruit pitting apparatus for whole peaches comprising an assembly of four plates each having flesh cutting edges for cutting a whole peach and each plate having a pit receiving means, means for positioning a whole peach to be cut by said assembly, power means for relatively shifting said plates and said peach to cause said peach to be cut by said plates, power means for pivotally shifting at least two of said plates in a common plane during a cutting operation on said peach whereby to receive the pit of the peach into the recesses formed between said two plates, means for holding the pit in such position between said recessed plates, and power means for shifting at least two of said plates in opposite directions away from the so held pit and while said last mentioned plates are in contact with severed faces of the peach to separate said peach into sections and for shifting said sections away from the peach to discharge said sections free of the pit.

47. A fruit pitting apparatus for whole peaches comprising an assembly of four plates each having flesh cutting edges for cutting a whole peach, each plate having a pit receiving recess, means for positioning said four plates substantially in a common plane, means for relatively shifting said peach and said plates while in said common plane to cause said plates to cut diametrically into the fruit, power means for shifting at least one pair of said plates while in said common plane and while forming a cut in said peach to cause the uncut pit to enter the recesses between said pair of plates, means for holding the pit in such position between said pair of recessed plates, and power means for shifting at least one pair of plates in opposite directions away from the held peach to separate said cut peach from the held pit.

48. A fruit pitting apparatus for whole peaches comprising an assembly of four plates, each having flesh cutting edges for cutting a whole peach, each plate having a pit receiving recess, means for positioning said four plates substantially in a common plane, means for relatively shifting said peach and said plates while in said common plane to cause said plates to cut diametrically into the fruit, power means for shifting at least one pair of said plates while in said common plane and while forming a cut in said peach to cause the uncut pit to enter the recesses between said pair of plates, means for holding the pit in such position between said pair of recessed plates, and power means for shifting at least one pair of plates in opposite directions away from the held peach to separate said cut peach from the held pit, said means for holding the pit comprising a fork adapted to embrace opposed side walls of the pit.

49. A fruit pitting apparatus comprising a first pair of plates mounted for movement toward and from each other in a common plane to pass about the pit while passing through the flesh of the fruit to sever the same, a second pair of plates mounted for movement from a first position in juxtaposition to said first pair of plates to a second position separated therefrom, and means for shifting a fruit to be pitted and said first and second pairs of plates relatively when the plates are in juxtaposition in said first position to cause the plates to sever the flesh of the fruit and lie between the severed halves of the fruit, and means for moving said second pair of plates from the first position to the second position whereby to spread the severed halves of the fruit.

50. A fruit pitting apparatus as set forth in claim 49 wherein the first pair of plates are provided with confronting notches forming a pit receiving recess between said first pair of plates.

51. In a fruit pitting apparatus as set forth in claim 49, including means for shifting said first pair of plates relatively in timed relation with the relative shifting of the fruit and plates to cause the first pair of plates to clear the pit as the plates and fruit move relatively along each other.

52. A fruit pitting apparatus comprising a relatively flat plate structure including a pair of plates having frontal flesh severing cutting edges and mounted for movement toward and from each other in a common plane to pass about the pit of the fruit as the plates pass through the flesh of the fruit to sever the same, said relatively flat plate structure also including a second pair of plates mounted for movement from a position in juxtaposed, substantially face to face contact relation with the first pair of plates to pass through the fruit with the first pair of plates as the flesh thereof is severed by the first pair of plates and to a position in spaced apart relation with said first plates to separate the severed halves of the fruit, means for moving the fruit and plates relatively to cause the plates to pass through the flesh of the fruit, and means for moving said plates from said first position to said second position in timed relation to the movement of the plates through the fruit to spread the severed halves of the fruit.

53. A fruit pitting apparatus comprising a relatively flat composite plate structure, said composite plates structure comprising two pairs of plates of which at least one pair is provided with frontal fruit cutting edges, means for shifting a fruit to be pitted and said plate structure relatively to cause the frontal cutting edges of said one pair of plates to cut diametrically into the fruit and the two pairs of plates to pass simultaneously through the fruit, means for mounting at least the plates of said one pair of plates for movement relative to each other substantially within a common plane during the cutting operation to cause the frontal cutting edges to move apart sufficiently to accommodate the pit, and means for moving at least one pair of said plates transversely of said common plane away from the other pair of plates to effect a separation thereof whereby to separate the fruit parts following the cutting operation.

54. A fruit pitting apparatus as set forth in claim 53 wherein a fork-like pit holder is mounted to project between the plates of said first mentioned one pair of plates to receive the uncut pit and hold the same against movement during movement of the plates to separate the fruit parts following the cutting operation.

HENRY A. SKOG.

REFERENCES CITED

The following references are of record in the file of this patent:

UNITED STATES PATENTS

| Number | Name | Date |
|---|---|---|
| 384,371 | Lillie | June 12, 1888 |
| 436,629 | Ish | Sept. 16, 1890 |
| 1,263,742 | Chase | Apr. 23, 1918 |
| 1,403,852 | Ensele | Jan. 17, 1922 |
| 1,526,635 | Groves | Feb. 17, 1925 |
| 1,785,021 | Whipple | Dec. 16, 1930 |
| 2,057,300 | Froehlich | Oct. 13, 1936 |
| 2,067,566 | Field | Feb. 12, 1937 |
| 2,185,090 | Millen | Dec. 26, 1939 |
| 2,216,165 | Ewald et al. | Oct. 1, 1940 |
| 2,229,168 | Carroll et al. | Jan. 21, 1941 |
| 2,238,971 | Carroll et al. | Apr. 22, 1941 |
| 2,255,048 | Ewald | Sept. 9, 1941 |
| 2,255,049 | Ewald | Sept. 9, 1941 |
| 2,272,415 | McLauchlan | Feb. 10, 1942 |
| 2,280,813 | Ewald et al. | Apr. 28, 1942 |
| 2,284,879 | Nemir | June 2, 1942 |

FOREIGN PATENTS

| Number | Country | Date |
|---|---|---|
| 18,708 | Netherlands | Sept. 15, 1928 |